(12) United States Patent
Li et al.

(10) Patent No.: US 12,284,613 B2
(45) Date of Patent: *Apr. 22, 2025

(54) COMMUNICATION CONFIGURATION FOR HIGH PATHLOSS OPERATIONS

(71) Applicant: QUALCOMM Incorporated, San Diego, CA (US)

(72) Inventors: Junyi Li, Fairless Hills, PA (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,936

(22) Filed: Oct. 3, 2022

(65) Prior Publication Data

US 2023/0027300 A1    Jan. 26, 2023

Related U.S. Application Data

(63) Continuation of application No. 16/806,738, filed on Mar. 2, 2020, now Pat. No. 11,463,964.

(Continued)

(51) Int. Cl.
*H04W 52/24* (2009.01)
*H04L 5/00* (2006.01)
(Continued)

(52) U.S. Cl.
CPC ......... *H04W 52/242* (2013.01); *H04L 5/0082* (2013.01); *H04L 5/0092* (2013.01);
(Continued)

(58) Field of Classification Search
CPC . H04W 52/242; H04W 56/001; H04W 76/27; H04W 88/14; H04W 72/23; H04L 5/0082; H04L 5/0092
See application file for complete search history.

(56) References Cited

U.S. PATENT DOCUMENTS 6,137,826 A    10/2000   Boesch
7,016,649 B1    3/2006   Narasimhan et al.
(Continued)

FOREIGN PATENT DOCUMENTS

CN    101341676 A    1/2009
CN    101569112 A    10/2009
(Continued)

OTHER PUBLICATIONS

3GPP TS 38.213: "3rd Generation Partnership Project; Technical Specification Group Radio Access Network; NR; Physical Layer Procedures for Control (Release 15)", 3GPP Draft, 38213-F50, 3rd Generation Partnership Project (3GPP), Mobile Competence Centre, 650, Route Des Lucioles, F-06921 Sophia-Antipolis Cedex, France, vol. RAN WG1, No. V15.5.0 (Mar. 2019), Mar. 27, 2019 (Mar. 27, 2019), 104 Pages, XP051722950, XP051686992, p. 12-p. 74, section 7.3.1.

(Continued)

Primary Examiner — Jael M Ulysse
(74) Attorney, Agent, or Firm — Holland & Hart /QUALCOMM Incorporated

(57) ABSTRACT

Methods, systems, and devices for wireless communications are described that provide for the management of different operation modes in wireless systems. For example, wireless device(s) may operate in a high pathloss operation mode or a normal pathloss operation mode based on the pathloss experienced between the transmitting and receiving devices. In some cases, a first wireless device may transmit a message to a second wireless device to configure a bandwidth part (BWP) for high pathloss mode communications. The message may be transmitted via control signaling and after receipt of the message, the second wireless device may enter a high pathloss mode for communications with the first wireless device (e.g., after a given time duration). Some (Continued)

parameters may be configurable (e.g., transmission duration, coding scheme) between high pathloss mode and normal pathloss mode, while other parameters may remain the same (e.g., processing time, switching time).

48 Claims, 18 Drawing Sheets

Related U.S. Application Data

(60) Provisional application No. 62/835,420, filed on Apr. 17, 2019.

(51) Int. Cl.
*H04W 56/00* (2009.01)
*H04W 72/23* (2023.01)
*H04W 76/27* (2018.01)
*H04W 88/14* (2009.01)

(52) U.S. Cl.
CPC ......... *H04W 56/001* (2013.01); *H04W 72/23* (2023.01); *H04W 76/27* (2018.02); *H04W 88/14* (2013.01)

(56) References Cited

U.S. PATENT DOCUMENTS

| | | |
|---|---|---|
| 8,327,002 B1 | 12/2012 | Van Dussen et al. |
| 9,319,886 B2 | 4/2016 | Jo et al. |
| 9,590,707 B1 | 3/2017 | Baik et al. |
| 9,877,322 B1 | 1/2018 | Sung et al. |
| 10,015,691 B2 | 7/2018 | Damnjanovic et al. |
| 10,219,182 B1 | 2/2019 | Hahn et al. |
| 10,334,588 B2 | 6/2019 | Sadek |
| 10,736,054 B2 | 8/2020 | Jiang et al. |
| 11,438,808 B2 | 9/2022 | Li et al. |
| 11,445,408 B2 | 9/2022 | Li et al. |
| 11,937,193 B2 | 3/2024 | Rico Alvarino et al. |
| 2004/0192323 A1 | 9/2004 | Valenzuela |
| 2005/0106910 A1 | 5/2005 | Chiu |
| 2006/0285504 A1 | 12/2006 | Dong et al. |
| 2008/0025254 A1 | 1/2008 | Love et al. |
| 2008/0159203 A1 | 7/2008 | Choi et al. |
| 2008/0189970 A1 | 8/2008 | Wang et al. |
| 2008/0268786 A1 | 10/2008 | Baker et al. |
| 2009/0028065 A1 | 1/2009 | Iwai et al. |
| 2009/0046653 A1 | 2/2009 | Singh et al. |
| 2009/0210474 A1 | 8/2009 | Shao et al. |
| 2010/0040036 A1 | 2/2010 | Ofuji et al. |
| 2010/0041413 A1 | 2/2010 | Sumasu et al. |
| 2010/0091725 A1 | 4/2010 | Ishii |
| 2010/0113041 A1* | 5/2010 | Bienas ................ H04W 48/10 455/450 |
| 2010/0120360 A1 | 5/2010 | Haustein et al. |
| 2010/0232352 A1 | 9/2010 | Merlin et al. |
| 2010/0309803 A1 | 12/2010 | Toh et al. |
| 2010/0329195 A1 | 12/2010 | Abraham et al. |
| 2010/0331030 A1* | 12/2010 | Nory ..................... H04W 72/23 455/63.1 |
| 2011/0002227 A1 | 1/2011 | Sampath et al. |
| 2011/0085502 A1 | 4/2011 | Malladi |
| 2011/0125488 A1 | 5/2011 | Birmingham |
| 2011/0143800 A1 | 6/2011 | Han et al. |
| 2011/0188598 A1 | 8/2011 | Lee et al. |
| 2011/0249578 A1* | 10/2011 | Nayeb Nazar ........ H04L 5/0053 370/252 |
| 2011/0261742 A1 | 10/2011 | Wentink |
| 2012/0157108 A1 | 6/2012 | Boudreau et al. |
| 2013/0003788 A1* | 1/2013 | Marinier ............. H04B 7/0636 375/219 |
| 2013/0028228 A1 | 1/2013 | Nakayama et al. |
| 2013/0034066 A1 | 2/2013 | Kakishima et al. |
| 2013/0089048 A1 | 4/2013 | Damnjanovic et al. |
| 2013/0265916 A1 | 10/2013 | Zhu et al. |
| 2013/0288695 A1 | 10/2013 | Okino |
| 2013/0301454 A1 | 11/2013 | Seol et al. |
| 2014/0071954 A1 | 3/2014 | Au et al. |
| 2014/0092865 A1 | 4/2014 | Heo et al. |
| 2014/0098761 A1* | 4/2014 | Lee ..................... H04W 24/02 370/329 |
| 2014/0105046 A1 | 4/2014 | Tellado et al. |
| 2014/0105136 A1 | 4/2014 | Tellado et al. |
| 2014/0153390 A1 | 6/2014 | Ishii et al. |
| 2014/0206382 A1 | 7/2014 | Shabtay |
| 2014/0226551 A1 | 8/2014 | Ouchi et al. |
| 2014/0254537 A1 | 9/2014 | Kim et al. |
| 2014/0274141 A1 | 9/2014 | Gholmieh et al. |
| 2014/0314000 A1 | 10/2014 | Liu et al. |
| 2014/0362716 A1 | 12/2014 | Zhang et al. |
| 2015/0011236 A1* | 1/2015 | Kazmi ................ H04W 52/365 455/456.1 |
| 2015/0358960 A1 | 12/2015 | Zhang et al. |
| 2015/0365939 A1 | 12/2015 | Zhang et al. |
| 2015/0373689 A1 | 12/2015 | Tabet et al. |
| 2016/0066301 A1 | 3/2016 | Zhu et al. |
| 2016/0088648 A1 | 3/2016 | Xue et al. |
| 2016/0270116 A1 | 9/2016 | Lin et al. |
| 2016/0286450 A1 | 9/2016 | Badic et al. |
| 2016/0295595 A1 | 10/2016 | Chae et al. |
| 2016/0308280 A1 | 10/2016 | Shimizu |
| 2016/0315686 A1 | 10/2016 | Song et al. |
| 2017/0034837 A1 | 2/2017 | Lopez-Perez et al. |
| 2017/0048772 A1 | 2/2017 | Gheorghiu et al. |
| 2017/0064743 A1 | 3/2017 | Lei et al. |
| 2017/0070961 A1 | 3/2017 | Bharadwaj et al. |
| 2017/0086080 A1 | 3/2017 | Sun et al. |
| 2017/0086137 A1 | 3/2017 | Sun et al. |
| 2017/0093038 A1 | 3/2017 | Li et al. |
| 2017/0215201 A1 | 7/2017 | Kim et al. |
| 2017/0238261 A1 | 8/2017 | Benjebbour et al. |
| 2017/0265169 A1 | 9/2017 | Chen et al. |
| 2017/0290008 A1 | 10/2017 | Tooher et al. |
| 2017/0310426 A1 | 10/2017 | Fan et al. |
| 2017/0325164 A1 | 11/2017 | Lee et al. |
| 2018/0007724 A1 | 1/2018 | Kazmi et al. |
| 2018/0020452 A1* | 1/2018 | Yerramalli ........ H04W 72/0453 |
| 2018/0027437 A1 | 1/2018 | Vitthaladevuni et al. |
| 2018/0042031 A1 | 2/2018 | Hampel et al. |
| 2018/0049137 A1* | 2/2018 | Li ....................... H04W 52/242 |
| 2018/0054339 A1 | 2/2018 | Sun et al. |
| 2018/0062770 A1 | 3/2018 | Reial et al. |
| 2018/0092073 A1 | 3/2018 | Nogami et al. |
| 2018/0098323 A1 | 4/2018 | Zhang et al. |
| 2018/0124790 A1 | 5/2018 | Yerramalli |
| 2018/0132197 A1 | 5/2018 | Lin et al. |
| 2018/0145798 A1 | 5/2018 | Suzuki et al. |
| 2018/0145819 A1 | 5/2018 | Axmon et al. |
| 2018/0160401 A1 | 6/2018 | Goto et al. |
| 2018/0176948 A1 | 6/2018 | Islam et al. |
| 2018/0198181 A1 | 7/2018 | Fukasawa |
| 2018/0199341 A1 | 7/2018 | Baldemair et al. |
| 2018/0219590 A1 | 8/2018 | Matsuda et al. |
| 2018/0220399 A1 | 8/2018 | Davydov et al. |
| 2018/0220465 A1 | 8/2018 | Zhang et al. |
| 2018/0234337 A1 | 8/2018 | Goliya et al. |
| 2018/0242264 A1* | 8/2018 | Pelletier ............. H04W 52/325 |
| 2018/0249492 A1 | 8/2018 | Xu et al. |
| 2018/0262288 A1 | 9/2018 | Gao et al. |
| 2018/0309553 A1 | 10/2018 | Cao et al. |
| 2018/0324716 A1* | 11/2018 | Jeon ................. H04W 74/0833 |
| 2018/0324853 A1* | 11/2018 | Jeon ..................... H04W 52/04 |
| 2018/0367263 A1 | 12/2018 | Ying et al. |
| 2018/0375619 A1 | 12/2018 | Hwang et al. |
| 2018/0376464 A1 | 12/2018 | Hosseini et al. |
| 2019/0007181 A1* | 1/2019 | Marinier ............... H04L 5/0051 |
| 2019/0044639 A1* | 2/2019 | Ouchi ................ H04W 72/23 |
| 2019/0044647 A1* | 2/2019 | Tomeba ............... H04L 5/0053 |
| 2019/0053072 A1 | 2/2019 | Kundargi et al. |
| 2019/0053205 A1* | 2/2019 | Tomeba ................. H04L 5/003 |
| 2019/0075597 A1 | 3/2019 | Yerramalli et al. |
| 2019/0082457 A1 | 3/2019 | Zhou et al. |
| 2019/0089498 A1* | 3/2019 | Pelletier ................. H04L 5/005 |

(56) References Cited

U.S. PATENT DOCUMENTS

| | | |
|---|---|---|
| 2019/0116605 A1 | 4/2019 | Luo et al. |
| 2019/0182870 A1* | 6/2019 | Shih .................... H04W 16/32 |
| 2019/0208538 A1 | 7/2019 | Lee et al. |
| 2019/0215766 A1 | 7/2019 | Wu et al. |
| 2019/0215896 A1 | 7/2019 | Zhou et al. |
| 2019/0253136 A1 | 8/2019 | Makki et al. |
| 2019/0260495 A1 | 8/2019 | Nammi |
| 2019/0261399 A1 | 8/2019 | Munier et al. |
| 2019/0288765 A1 | 9/2019 | Lee et al. |
| 2019/0313406 A1 | 10/2019 | Liu et al. |
| 2019/0327123 A1 | 10/2019 | Wang et al. |
| 2019/0349079 A1 | 11/2019 | Novlan et al. |
| 2020/0015209 A1 | 1/2020 | Zhang |
| 2020/0068497 A1 | 2/2020 | Gong et al. |
| 2020/0107335 A1 | 4/2020 | Xue et al. |
| 2020/0107355 A1 | 4/2020 | Zhou |
| 2020/0145860 A1 | 5/2020 | Koskela et al. |
| 2020/0146059 A1* | 5/2020 | Cirik .................... H04L 5/001 |
| 2020/0205083 A1 | 6/2020 | Chen et al. |
| 2020/0288409 A1 | 9/2020 | Li et al. |
| 2020/0296673 A1* | 9/2020 | Ouchi ................. H04W 52/325 |
| 2020/0328850 A1 | 10/2020 | Feng |
| 2020/0336920 A1 | 10/2020 | Li et al. |
| 2020/0336994 A1 | 10/2020 | Li et al. |
| 2020/0337004 A1 | 10/2020 | Li et al. |
| 2020/0337028 A1 | 10/2020 | Li et al. |
| 2021/0022091 A1* | 1/2021 | Li .................... H04W 52/242 |
| 2021/0037441 A1 | 2/2021 | Khalid et al. |
| 2021/0045076 A1 | 2/2021 | Tomeba et al. |
| 2021/0084693 A1 | 3/2021 | Zhang et al. |
| 2021/0136639 A1 | 5/2021 | Osawa |
| 2021/0143959 A1 | 5/2021 | Xu et al. |
| 2021/0168782 A1 | 6/2021 | Hamidi Sepehr et al. |
| 2021/0195674 A1* | 6/2021 | Park ..................... H04W 24/04 |
| 2021/0204307 A1 | 7/2021 | Lee et al. |
| 2021/0235386 A1 | 7/2021 | Zhang et al. |
| 2021/0314892 A1 | 10/2021 | Rico Alvarino et al. |
| 2021/0410084 A1 | 12/2021 | Li et al. |
| 2022/0174694 A1 | 6/2022 | Hwang et al. |
| 2022/0394561 A1 | 12/2022 | Li et al. |
| 2023/0052171 A1 | 2/2023 | Li et al. |
| 2023/0069736 A1 | 3/2023 | Li et al. |
| 2023/0085790 A1 | 3/2023 | Li et al. |
| 2023/0147731 A1 | 5/2023 | Li et al. |
| 2023/0247577 A1 | 8/2023 | Rico Alvarino et al. |
| 2024/0015757 A1 | 1/2024 | Li et al. |

FOREIGN PATENT DOCUMENTS

| | | |
|---|---|---|
| CN | 102792625 A | 11/2012 |
| CN | 103220702 A | 7/2013 |
| CN | 105052068 A | 11/2015 |
| CN | 105103467 A | 11/2015 |
| CN | 106688193 A | 5/2017 |
| CN | 107113902 A | 8/2017 |
| CN | 108028743 A | 5/2018 |
| CN | 108781103 A | 11/2018 |
| EP | 1515471 A1 | 3/2005 |
| EP | 1641188 A1 | 3/2006 |
| EP | 2120364 A1 | 11/2009 |
| EP | 2504942 A1 | 10/2012 |
| EP | 3179660 A1 | 6/2017 |
| KR | 20180136855 A | 12/2018 |
| WO | WO-2015089253 | 6/2015 |
| WO | WO2016040290 A1 | 3/2016 |
| WO | WO-2016061382 A1 | 4/2016 |
| WO | WO-2017040002 A1 | 3/2017 |
| WO | WO-2019032799 A1 | 2/2019 |
| WO | WO2019070579 | 4/2019 |
| WO | WO-2019102065 A1 | 5/2019 |

OTHER PUBLICATIONS

AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518094, 15 pages, Retrieved from the Internet: URL: http://www.3gpp.org/ftp/tsg_ran/WG1_RL1/TSGR1_94b/Docs/R1-1810690.zip [retrieved on Sep. 29, 2018] Chapter 2.3 "Frame Structure Design and Backhaul Multiplexing".

Huawei, et al., "Physical Layer Enhancement on IAB", 3GPP TSG-RAN WG1 Meeting #92bis, 3GPP Draft; R1-1803695, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 6 Pages, XP051425992, Retrieved from the Internet: URL: http://www.3gpp.org/ftp/Meetings%5F3GPP%5FSYNC/RAN1/Docs/ [retrieved on Apr. 15, 2018] Sections 2.1 and 2.2.

International Search Report and Written Opinion—PCT/US2020/020795—ISAEPO—dated Jun. 2, 2020.

LG Electronics: "Discussions on Mechanisms to Support NR IAB Scenarios", 3GPP Draft, 3GPP TSG RAN WG1 Meeting #94bis, R1-1810273, Discussions on NR IAB Support_V0, 3rd Generation Partnership Project, (3gpp), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517687, 7 pages, Retrieved from the Internet: URL: http://www.3gpp.org/ftp/tsg%5Fran/WG1%5FRL1/TSGR1%5F94b/Docs/R1%2D1810273%2Ezip, [retrieved on Sep. 29, 2018] Chapter 6 "Access and Backhaul Timing" Chapter 7 "TDM Patterns", Paragraph [0007].

Qualcomm Incorporated: "Inter-IAB-Node Discovery", 3GPP Draft, 3GPP TSG RAN WG1 Meeting #93, R1-1807395, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018 (May 12, 2018), XP051463086, 8 Pages, Retrieved from the Internet: URL: http://www.3gpp.org/ftp/tsg%5Fran/WG1%5FRL1/TSGR1%5F93/Docs, [retrieved on May 12, 2018], paragraph [0003].

Qualcomm Incorporated: "Resource Allocation for PUCCH", 3GPP Draft, 3GPP TSG RAN WG1 Meeting #90b, R1-1718806 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017, XP051341951, 10 Pages.

Spreadtrum Communications: "On RS Multiplexing", 3GPP TSG RAN WG1 Meeting #90, R1-1713051_On RS Multiplexing_Final, 3rd Generation Partnership Project, Mobile Competence Centre, 650, Route Des Lucioles, F-06921 Sophia-Antipolis Cedex, France, vol. Ran WG1, No. Prague, Czech Rep, Aug. 21, 2017-Aug. 25, 2017, Aug. 20, 2017, XP051315860, 8 Pages, Sections 4-5.

* cited by examiner

COMMUNICATION CONFIGURATION FOR HIGH PATHLOSS OPERATIONS

CROSS REFERENCE

The present application for patent is a Continuation of U.S. patent application Ser. No. 16/806,738 by LI et al., entitled "COMMUNICATION CONFIGURATION FOR HIGH PATHLOSS OPERATIONS" filed Mar. 2, 2020, which claims the benefit of U.S. Provisional Patent Application No. 62/835,420 by LI et al., entitled "COMMUNICATION CONFIGURATION FOR HIGH PATHLOSS OPERATIONS," filed Apr. 17, 2019, each of which is assigned to the assignee hereof and expressly incorporated by reference in their entirety herein.

INTRODUCTION

The following relates to wireless communications, and more specifically to communication configurations for wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple access communications system may include a number of base stations or network access nodes, each simultaneously supporting communication for multiple communication devices, which may be otherwise known as user equipment (UE).

SUMMARY

A method of wireless communications at a first wireless device is described. The method may include determining a communication configuration for a second wireless device, the communication configuration indicating one or more configuration parameters for a bandwidth part (BWP), a length of a synchronization signal block (SSB), or a combination thereof, associated with a first mode, transmitting an indication of the communication configuration to the second wireless device for operating in the first mode, where a first length of a first transmission time interval (TTI) associated with the first mode is different from a second length of a second TTI associated with a second mode, and communicating with the second wireless device operating in the first pathloss mode based on the one or more configuration parameters.

An apparatus for wireless communications at a first wireless device is described. The apparatus may include a processor and memory coupled to the processor. The processor and memory configured to cause the apparatus to determine a communication configuration for a second wireless device, the communication configuration indicating one or more configuration parameters for a BWP, an SSB, or a combination thereof, associated with a first mode, transmit an indication of the communication configuration to the second wireless device for operating in the first mode, where a first length of a first TTI associated with the first mode is different from a second length of a second TTI associated with a second mode, and communicate with the second wireless device operating in the first mode based on the one or more configuration parameters.

Another apparatus for wireless communications at a first wireless device is described. The apparatus may include means for determining a communication configuration for a second wireless device, the communication configuration determining one or more configuration parameters for a BWP, an SSB, or a combination thereof, associated with a first mode, transmitting an indication of the communication configuration to the second wireless device for operating in the first mode, where a first length of a first TTI associated with the first mode is different from a second length of a second TTI associated with a second mode, and communicating with the second wireless device operating in the first mode based on the one or more configuration parameters.

A non-transitory computer-readable medium storing code for wireless communications at a first wireless device is described. The code may include instructions executable by a processor to identify a communication configuration for a second wireless device, the communication configuration indicating one or more configuration parameters for a BWP, an SSB, or a combination thereof, associated with a first mode, transmit an indication of the communication configuration to the second wireless device for operating in the first mode, where a first length of a first TTI associated with the first mode is different from a second length of a second TTI associated with a second mode, and communicate with the second wireless device operating in the first pathloss mode based on the one or more configuration parameters.

Some examples of the method, apparatuses, and non-transitory computer-readable medium described herein may further include operations, features, means, or instructions for operating in the first mode for communications with the second wireless device, and transmitting the indication of the communication configuration to the second wireless device for the second wireless device to communicate via the BWP, SSB, or the combination based on operating in the first mode. In some cases, the first mode may be a first pathloss mode.

Some examples of the method, apparatuses, and non-transitory computer-readable medium described herein may further include operations, features, means, or instructions for communicating with the second wireless device via the BWP, the SSB, or the combination after a time duration indicated by the communication configuration.

Some examples of the method, apparatuses, and non-transitory computer-readable medium described herein may further include operations, features, means, or instructions for transmitting an information element (IE) for the BWP, the SSB, or the combination in the one or more configuration parameters, the IE indicating that the BWP, the SSB, or the combination may be configured for the first mode.

In some examples of the method, apparatuses, and non-transitory computer-readable medium described herein, the one or more configuration parameters includes at least one of control resource set information, channel state information (CSI) resources, sounding reference signal (SRS) resources, a TTI duration, tracking reference signal (TRS) information, or any combination thereof associated with the BWP, the SSB, or the combination.

In some examples of the method, apparatuses, and non-transitory computer-readable medium described herein, the IE includes a single bit field.

In some examples of the method, apparatuses, and non-transitory computer-readable medium described herein, at least a portion of the one or more configuration parameters may be the same as one or more configuration parameters for a second BWP, a second SSB, or a combination thereof, associated with the second mode. In some cases, the second mode may be a second pathloss mode.

In some examples of the method, apparatuses, and non-transitory computer-readable medium described herein, a processing time parameter, a transmission beam parameter, a latency parameter, or any combination thereof of the one or more configuration parameters may be the same as a corresponding parameter of the one or more configuration parameters for the second BWP, the second SSB, or the combination.

Some examples of the method, apparatuses, and non-transitory computer-readable medium described herein may further include operations, features, means, or instructions for transmitting the indication of the communication configuration via radio resource control (RRC) signaling or downlink control information (DCI).

Some examples of the method, apparatuses, and non-transitory computer-readable medium described herein may further include operations, features, means, or instructions for configuring the BWP for the second wireless device for communications in the first mode, the BWP including one of a downlink BWP or an uplink BWP, where the operation parameter may be for the BWP.

Some examples of the method, apparatuses, and non-transitory computer-readable medium described herein may further include operations, features, means, or instructions for configuring a second BWP, a second SSB, or a combination for the second wireless device for communications in the second mode.

In some examples of the method, apparatuses, and non-transitory computer-readable medium described herein, the first wireless device and the second wireless device may be integrated access and backhaul (IAB) nodes operating in an IAB network.

In some examples of the method, apparatuses, and non-transitory computer-readable medium described herein, the first mode may be a high pathloss mode and the second mode may be a normal mode.

In some examples of the method, apparatuses, and non-transitory computer-readable medium described herein, the first length of the first TTI associated with the first pathloss mode may be longer than the second length of the second TTI associated with the second mode.

A method of wireless communications at a first wireless device is described. The method may include receiving, from a second wireless device, an indication of a communication configuration for operating in a first mode, the communication configuration indicating one or more configuration parameters for a BWP, an SSB, or a combination thereof, associated with the first mode and communicating with the second wireless device in the first mode based on the one or more configuration parameters, where a first length of a first TTI associated with the first mode is different from a second length of a second TTI associated with a second mode.

An apparatus for wireless communications at a first wireless device is described. The apparatus may include a processor and memory coupled to the processor. The processor and memory may be configured to cause the apparatus to receive, from a second wireless device, an indication of a communication configuration for operating in a first mode, the communication configuration indicating one or more configuration parameters for a BWP, an SSB, or a combination thereof, associated with the first mode and communicate with the second wireless device in the first mode based on the one or more configuration parameters, where a first length of a first TTI associated with the first mode is different from a second length of a second TTI associated with a second mode.

Another apparatus for wireless communications at a first wireless device is described. The apparatus may include means for receiving, from a second wireless device, an indication of a communication configuration for operating in a first mode, the communication configuration indicating one or more configuration parameters for a BWP, an SSB, or a combination thereof, associated with the first mode and communicating with the second wireless device in the first mode based on the one or more configuration parameters, where a first length of a first TTI associated with the first mode is different from a second length of a second TTI associated with a second mode.

A non-transitory computer-readable medium storing code for wireless communications at a first wireless device is described. The code may include instructions executable by a processor to receive, from a second wireless device, an indication of a communication configuration for operating in a first mode, the communication configuration indicating one or more configuration parameters for a BWP, an SSB, or a combination thereof, associated with the first mode and communicate with the second wireless device in the first mode based on the one or more configuration parameters, where a first length of a first TTI associated with the first pathloss mode is different from a second length of a second TTI associated with a second mode.

Some examples of the method, apparatuses, and non-transitory computer-readable medium described herein may further include operations, features, means, or instructions for receiving the indication of the communication configuration to communicate based on the first wireless device operating in the first mode.

Some examples of the method, apparatuses, and non-transitory computer-readable medium described herein may further include operations, features, means, or instructions for communicating after a time duration indicated by the communication configuration.

Some examples of the method, apparatuses, and non-transitory computer-readable medium described herein may further include operations, features, means, or instructions for identifying an IE associated with the BWP, the SSB, or the combination in the one or more configuration parameters, the IE indicating that the BWP, the SSB, or the combination may be configured for the first mode.

In some examples of the method, apparatuses, and non-transitory computer-readable medium described herein, the one or more configuration parameters includes at least one of control resource set information, CSI resources, SRS resources, a TTI duration, TRS information, or any combination thereof associated with the BWP, the SSB, or the combination.

In some examples of the method, apparatuses, and non-transitory computer-readable medium described herein, the IE includes a single bit field.

In some examples of the method, apparatuses, and non-transitory computer-readable medium described herein, at least one of the one or more configuration parameters may be the same as one or more configuration parameters for a second BWP, a second SSB, or a combination associated with the second mode.

In some examples of the method, apparatuses, and non-transitory computer-readable medium described herein, a processing time parameter, a transmission beam parameter, a latency parameter, or any combination thereof of the one or more configuration parameters may be the same as a corresponding parameter of one or more configuration parameters for the second BWP, the second SSB, or the combination.

Some examples of the method, apparatuses, and non-transitory computer-readable medium described herein may further include operations, features, means, or instructions for receiving the indication of the communication configuration via RRC signaling or DCI.

Some examples of the method, apparatuses, and non-transitory computer-readable medium described herein may further include operations, features, means, or instructions for configuring the BWP for the first wireless device for communications in the first mode, the BWP including one of a downlink BWP or an uplink BWP, where the configuration parameters are for a BWP.

Some examples of the method, apparatuses, and non-transitory computer-readable medium described herein may further include operations, features, means, or instructions for configuring a second BWP, a second SSB, or a combination for the first wireless device for communications in the second mode.

In some examples of the method, apparatuses, and non-transitory computer-readable medium described herein, the first wireless device and the second wireless device may be IAB nodes operating in an IAB network.

In some examples of the method, apparatuses, and non-transitory computer-readable medium described herein, the first mode may be a high pathloss mode and the second mode may be a normal mode.

In some examples of the method, apparatuses, and non-transitory computer-readable medium described herein, the first length of the first TTI associated with the first mode may be longer than the second length of the second TTI associated with the second mode.

A method of wireless communications at a first wireless device is described. The method may include determining a communication configuration for a second wireless device, the communication configuration including one or more configuration parameters for a BWP, an SSB, or a combination thereof, associated with a first mode and communicating with the second wireless device according to the first mode based on the one or more configuration parameters, where a first length of a first TTI associated with the first mode is different from a second length of a second TTI associated with a second mode.

An apparatus for wireless communications at a first wireless device is described. The apparatus may include a processor and memory coupled to the processor. The memory and processor further configured to cause the apparatus to determine a communication configuration for a second wireless device, the communication configuration including one or more configuration parameters for a BWP, an SSB, or a combination thereof, associated with a first mode and communicate with the second wireless device according to the first mode based on the one or more configuration parameters, where a first length of a first TTI associated with the first pathloss mode is different from a second length of a second TTI associated with a second mode.

Another apparatus for wireless communications at a first wireless device is described. The apparatus may include means for determining a communication configuration for a second wireless device, the communication configuration including one or more configuration parameters for a BWP, an SSB, or a combination thereof, associated with a first mode and communicating with the second wireless device according to the first mode based on the one or more configuration parameters, where a first length of a first TTI associated with the first mode is different from a second length of a second TTI associated with a second mode.

A non-transitory computer-readable medium storing code for wireless communications at a first wireless device is described. The code may include instructions executable by a processor to identify a communication configuration for a second wireless device, the communication configuration including one or more configuration parameters for a BWP, an SSB, or a combination thereof, associated with a first mode and communicate with the second wireless device according to the first mode based on the one or more configuration parameters, where a first length of a first TTI associated with the first mode is different from a second length of a second TTI associated with a second mode.

Some examples of the method, apparatuses, and non-transitory computer-readable medium described herein may further include operations, features, means, or instructions for entering the first mode for communications with the second wireless device, and communicating with the second wireless device after a time duration after entering the first mode. In some cases, the first mode may be a first pathloss mode.

In some examples of the method, apparatuses, and non-transitory computer-readable medium described herein, the one or more configuration parameters include at least one of control resource set information, CSI resources, SRS resources, a TTI duration, TRS information, or any combination thereof associated with the BWP, the SSB, or the combination.

In some examples of the method, apparatuses, and non-transitory computer-readable medium described herein, at least one of the one or more configuration parameters may be the same as one or more configuration parameters for a second BWP, a second SSB, or a combination associated with the second mode.

In some examples of the method, apparatuses, and non-transitory computer-readable medium described herein, a processing time parameter, a transmission beam parameter, a latency parameter, or any combination thereof of the one or more configuration parameters may be the same as a corresponding parameter of the one or more configuration parameters for the second BWP, the second SSB, or the combination.

Some examples of the method, apparatuses, and non-transitory computer-readable medium described herein may further include operations, features, means, or instructions for configuring the BWP, the SSB, or the combination for the second wireless device for communications in the first mode based on the one or more configuration parameters for the BWP, the SSB, or the combination, and configuring the second BWP, the SSB, or the combination for the second wireless device for communications in the second mode based on the one or more configuration parameters for the second BWP, the SSB, or the combination.

In some examples of the method, apparatuses, and non-transitory computer-readable medium described herein, the first wireless device and the second wireless device may be IAB nodes operating in an IAB network.

In some examples of the method, apparatuses, and non-transitory computer-readable medium described herein, the first mode may be a high pathloss mode and the second mode may be a normal mode.

In some examples of the method, apparatuses, and non-transitory computer-readable medium described herein, the first length of the first TTI associated with the first pathloss mode may be longer than the second length of the second TTI associated with the second mode.

DETAILED DESCRIPTION

Figure 1:
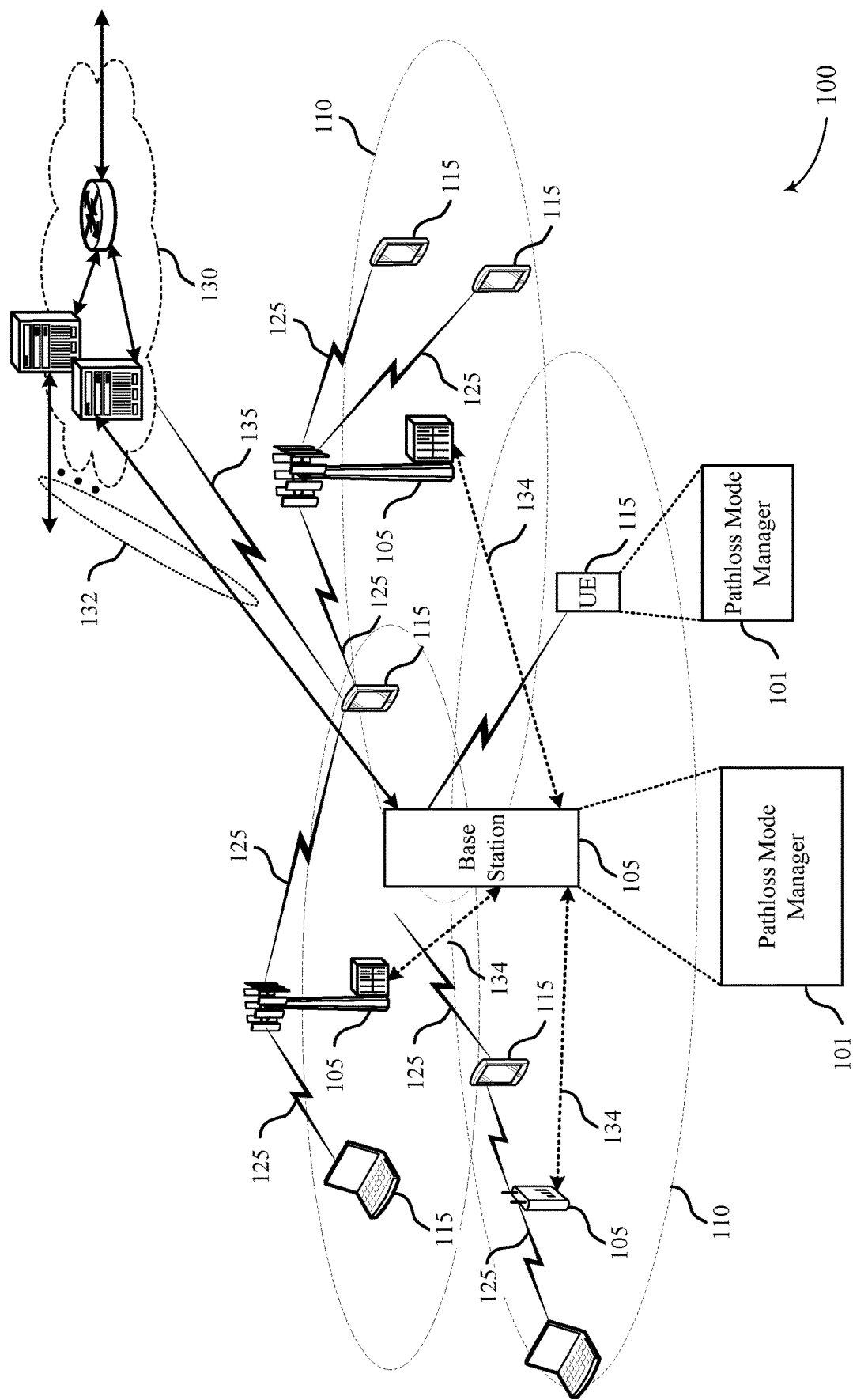
FIGS. 1 through 3 illustrate examples of a wireless communications system that supports communication configuration for high pathloss operations in accordance with one or more aspects of the present disclosure.

Some wireless communications systems may include access nodes to facilitate wireless communications between a user equipment (UE) and a network. Such deployments may use beamformed transmissions in millimeter wave (mmW) frequency ranges for communications between different nodes, which may include access or backhaul communications. For instance, a parent node (which may also be referred to as a donor node, an anchor node, or other like terminology) may have a high-capacity, wired, backhaul connection (e.g., fiber) to the core network. The parent node may also communicate (e.g., using directional beams) with one or more other nodes (e.g., relay nodes or devices) or UEs that may be referred to as child nodes. As such, wireless communications between the parent node and other devices may include backhaul communications, access communications, or a combination thereof. Such systems may be referred to as an integrated access and backhaul (IAB) network.

Wireless communication systems such as an IAB network may operate in mmW frequency ranges, e.g., 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. Due to the increased pathloss in mmW communication systems, transmissions from the base station or the UE may be beamformed. Moreover, a receiving device may use beamforming techniques to configure antenna(s) or antenna array(s) such that transmissions are received in a directional manner. In some cases, the pathloss over a channel may become excessive and a high pathloss mode may be enabled such that the transmissions duration of signals, control and data channels is increased. For instance, the high pathloss mode may utilize relatively longer TTIs for certain channels, such as a physical uplink shared channel (PUSCH) and physical downlink shared channel (PDSCH), to attempt to overcome the pathloss experienced on the channel. In some cases, the transmission time intervals (TTIs) of a PDSCH or a PUSCH may have a duration on the order of multiple TTIs (e.g., multiple slots or 10 ms). This duration may be determined based on a balance between a physical downlink control channel (PDCCH) occupying the length of a slot while keeping the overhead of PDCCH from becoming too high.

In cases where pathloss exceeds the threshold or is outside the given range, some networks may be unable to support communications. Additionally, certain deployment scenarios may experience excessive pathloss (e.g., such as in a mmW network) that exceeds the ability of some techniques (e.g., beamforming) to accommodate larger variations in pathloss. For instance, some techniques may not be capable of supporting wireless communications between devices (e.g., nodes in an IAB network) when the pathloss value between the communicating devices satisfies or otherwise exceeds a threshold pathloss value. In such cases, devices may be capable of operating in multiple modes, such as a normal mode and a high pathloss mode, where the high pathloss mode may operate in a narrow bandwidth to accommodate the pathloss experienced between the transmitter and receiver. In a narrower band, the transmitter may concentrate its power on fewer resources to overcome pathloss, and the receiver may simplify its channel estimation while maintaining sufficient performance to support communications.

Techniques for managing communications for devices switching between high pathloss mode and normal mode are described. Devices used may include a node within and IAB network. A first device (e.g., a parent device, IAB node), upon entering a high pathloss mode may message a second device (e.g., a child device) to activate a high pathloss communication configuration for communicating with the parent device. The high pathloss communication configuration may indicate to the child device to enable a configuration for a high pathloss bandwidth part (BWP). The indication may be sent from the parent to the UE after a certain time after the parent has entered high pathloss mode. The message sent to the second device may include a control message sent via radio resource control (RRC) signaling that includes a BWP information element (IE). In some cases, the IE includes an additional one or more bits of information. The additional bit(s) may indicate that the BWP has been configured for a high pathloss mode, and also may indicate that the receiving device is to enter high pathloss mode operations (e.g., after a time duration). Through the use of the additional bit(s), signaling for entering or exiting a high pathloss mode may be reduced.

According to some aspects, in cases where the additional bit that indicates BWP configuration indicates a high pathloss mode, rules specific to high pathloss operations may be defined (the time duration of certain signals, resources, and parameters would be available for configuration, interrupting PUSCH for TRSs, etc.), which may be different for high pathloss mode operations compared to normal operations. Such parameters may be configurable and dynamic between multiple modes, but in other cases, some parameters may remain the same (e.g., may be static or not configurable) between modes. For instance, processing time related to control parameters (e.g., the latency parameters related to scheduling data transmissions, receiving data transmission, and acknowledgement (ACK) of data transmissions) may be static. In some examples, the timing between PDCCH scheduling a PDSCH and transmission of the corresponding PDSCH, the timing between a PDSCH and a corresponding physical uplink control channel (PUCCH) containing feedback information (e.g., ACK or negative ACK (NACK)), the timing between a PDCCH scheduling an uplink data transmission and a corresponding PUSCH, and the timing between transmission of a PUSCH and transmission of a corresponding PDCCH carrying feedback information, as well as parameters related to control operations may remain the same for the normal and high pathloss modes.

Aspects of the disclosure are initially described in the context of wireless communications systems. Aspects are then described with respect to configuration parameters, timing diagrams, and a process flow. Aspects of the disclosure are further illustrated by and described with reference to apparatus diagrams, system diagrams, and flowcharts that relate to communication configuration for high pathloss operations.

FIG. 1 illustrates an example of a wireless communications system 100 that supports communication configuration for high pathloss operations in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 GHz. In some cases, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometers) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals (RSs), beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, RSs, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM.

The organizational structure of the carriers may be different for different radio access technologies (RATs) such as LTE, LTE-A, LTE-A Pro, NR, etc. For example, communications over a carrier may be organized according to TTIs or slots, each of which may include user data as well as control information or signaling to support decoding the user data. A carrier may also include dedicated acquisition signaling (synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous or concurrent communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As described herein, the devices of wireless communications system 100 (e.g., base station 105 or UEs 115) may use techniques for configuring communications in different pathloss modes (e.g., a high pathloss mode, a normal pathloss mode). For example, one or more of the base stations 105 or the UEs 115 may include a pathloss mode manager 101, which may manage operations for a given device according to a high pathloss operations mode or a normal pathloss operations mode. In some cases, upon entering a high pathloss mode, a base station 105, which may be an IAB node, may transmit a message to (e.g., the pathloss mode manager 101 may transmit RRC signaling) a UE 115 or a neighboring base station 105 to activate a high pathloss communication configuration for communicating with the base station 105. The high pathloss communication configuration may be configured by the pathloss mode manager 101 and may indicate a configuration for a high pathloss BWP. In some examples, the pathloss mode manager 101 may indicate that the receiving device is to enter high pathloss mode operations after a given time duration.

According to some aspects, some parameters may be configurable (e.g., dynamic) between multiple modes, while other parameters may remain the same (e.g., may be static or not configurable) between modes. For instance, processing time related to control parameters (e.g., the latency parameters related to scheduling data transmissions, receiving data transmission, and ACK of data transmissions) may be static as the processing time may be based on the capabilities of a receiving device and thus, independent of the pathloss. Additionally, or alternatively, parameters related to control operations may remain the same for the normal and high pathloss modes. The pathloss mode manager 101 may configure parameters for normal or high pathloss modes.

Figure 2:
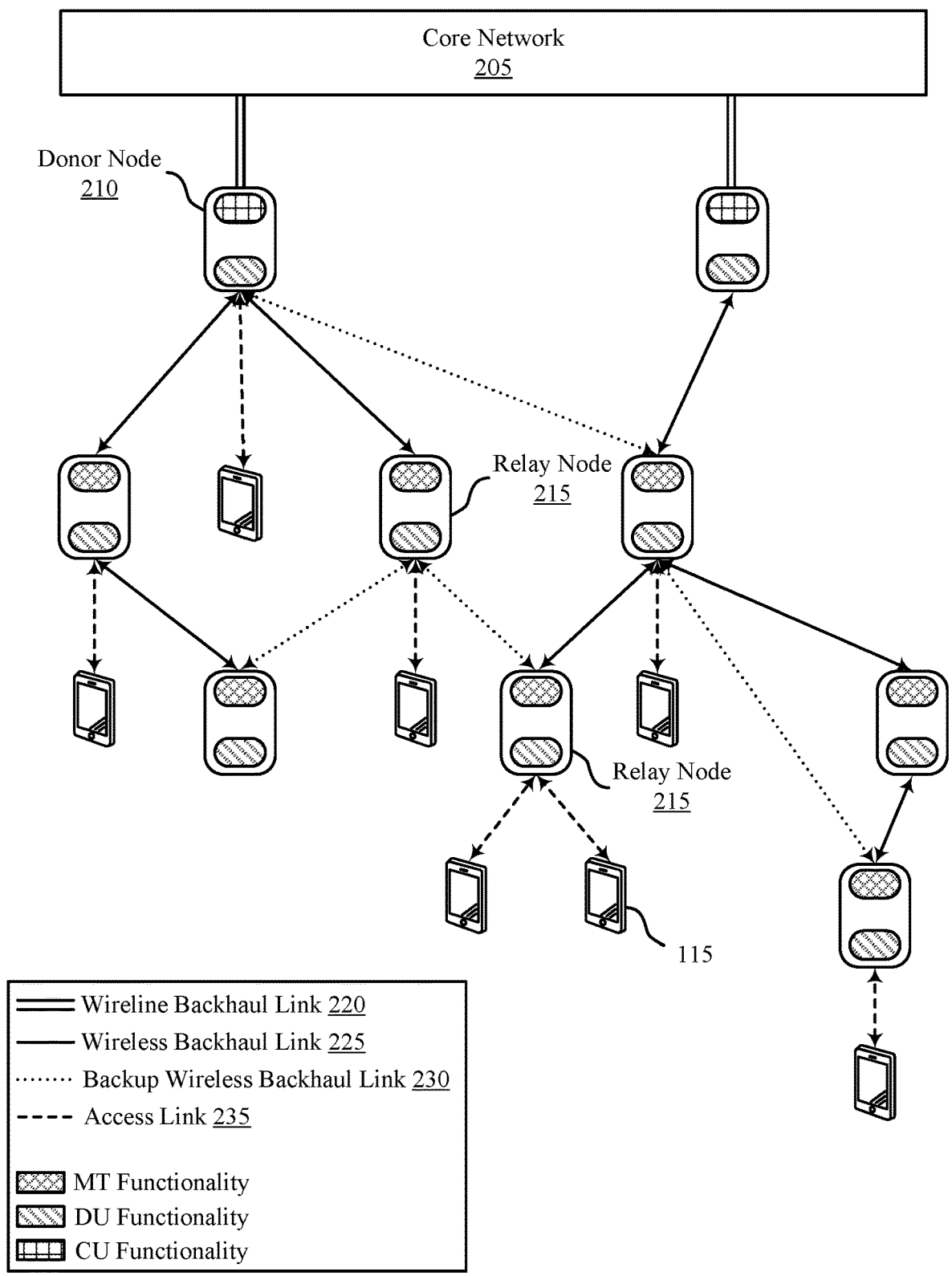

FIG. 2 illustrates an example of a wireless communications system 200 that supports communication configuration for high pathloss operations in accordance with one or more aspects of the present disclosure. Wireless communications system 200 (an NR system, a mmW system, etc.) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as IAB nodes, such as IAB donor nodes 210 and IAB relay nodes 215. Wireless communications system 200 may additionally support a number of UEs 115, which may communicate on the uplink with one or more IAB donor nodes 210, IAB relay nodes 215, or a combination of these devices. In some examples, wireless communications system 200 may implement aspects of wireless communications system 100.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (wireless backhaul links 225, backup wireless backhaul links 230, access links 235, etc.). An IAB donor node 210 may be split into associated base station centralized unit (CU) and distributed unit (DU) entities, where one or more DUs associated with an IAB donor node 210 may be partially controlled by an associated CU. CUs of IAB donor nodes 210 may host layer 3 (L3) (e.g., RRC, service data adaption protocol (SDAP), PDCP) functionality and signaling. Furthermore, CUs of IAB donor nodes 210 may communicate with the core network 205 over a wireline backhaul link 220 (e.g., which may be referred to as an NG interface). DUs may host lower layer operations, such as layer 1 (L1) or layer 2 (L2) (RLC, MAC, physical layer, etc.) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child) IAB relay nodes 215 and or UEs 115. For example, a DU may support an RLC channel connection with a UE 115 (e.g., via an access link 235) or with an IAB relay node 215 (e.g., via a backhaul link, such as a primary wireless backhaul link 225 or a backup wireless backhaul link 230).

IAB relay nodes 215 may be split into associated mobile terminal (MT) and base station DU entities, where MT functionality of the IAB relay nodes 215 may be controlled or scheduled by antecedent (i.e., parent) IAB nodes via wireless backhaul links. A parent node to an IAB relay node 215 may be another (antecedent) IAB relay node 215 or an IAB donor node 210. The MT functionality may be similar to functionality performed by UEs 115 in the system. An IAB relay node 215 may not be directly connected to a wireline backhaul 220. Instead, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT functionality. In some cases, DUs of the IAB relay nodes 215 may be partially controlled by signaling messages from CU entities of an associated IAB donor node 210 (e.g., transmitted via an F1-application protocol (AP)). The DUs of the IAB relay nodes 215 may support serving cells of the network coverage area. For example, a DU of an IAB relay node 215 may perform the same or similar functions as a DU of an IAB donor node 210, supporting one or more access links 235 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU or the core network 205 either directly or via one or more IAB relay nodes 215. Each IAB relay node 215 may include a primary wireless backhaul link 225 for relaying data upstream or receiving information from a base station CU or the core network 205. In some cases, an IAB relay node 215 may additionally include one or more backup wireless backhaul links 230 (e.g., for redundant connectivity or improved robustness). If the primary wireless backhaul link 225 fails (due to interference, malfunction at a connected IAB node, movement of IAB nodes, maintenance at IAB nodes, etc.), an IAB relay node 215 may utilize a backup wireless backhaul link 230 for backhaul communication within the IAB network. The first (e.g., primary) wireless backhaul link 225 may be associated with a coverage area and MT functionality may be controlled or scheduled by a first parent node. The one or more secondary backhaul links (e.g., backup wireless backhaul links 230) may be associated with a non-collocated coverage area and controlled or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control or schedule descendant IAB relay nodes 215 and UEs 115 within the IAB network (e.g., downstream in the IAB network) via the configured backhaul and access links. That is, an IAB relay node 215 may act as a relay between an IAB donor node 210 and one or more descendant devices (other IAB relay nodes 215, UEs 115, etc.) in both communication directions based on established backhaul and access connections.

IAB relay node 215 or IAB donor node 210 may operate in multiple modes such as a high pathloss operation mode and a normal pathloss operation mode. The mode of operation may be based on the pathloss experienced between the transmitting and receiving devices. In some cases, IAB donor node 210 may experience high pathloss with an IAB relay node 215 in communication with the IAB donor node 210. In such instances, the IAB donor node 210 may transmit a message to the IAB relay node 215 to configure a BWP for high pathloss communications. After receiving the message, IAB relay node 215 may enter high pathloss (e.g., after a given time duration), and may communicate via the configured BWP for high pathloss communications. According to some aspects, some parameters may be configurable (e.g., dynamic) between high pathloss mode and normal pathloss mode, while other parameters may remain the same (e.g., may be static or not configurable). For instance, processing time related to control parameters or parameters related to control operations may remain the same for the normal and high pathloss modes.

Figure 3:
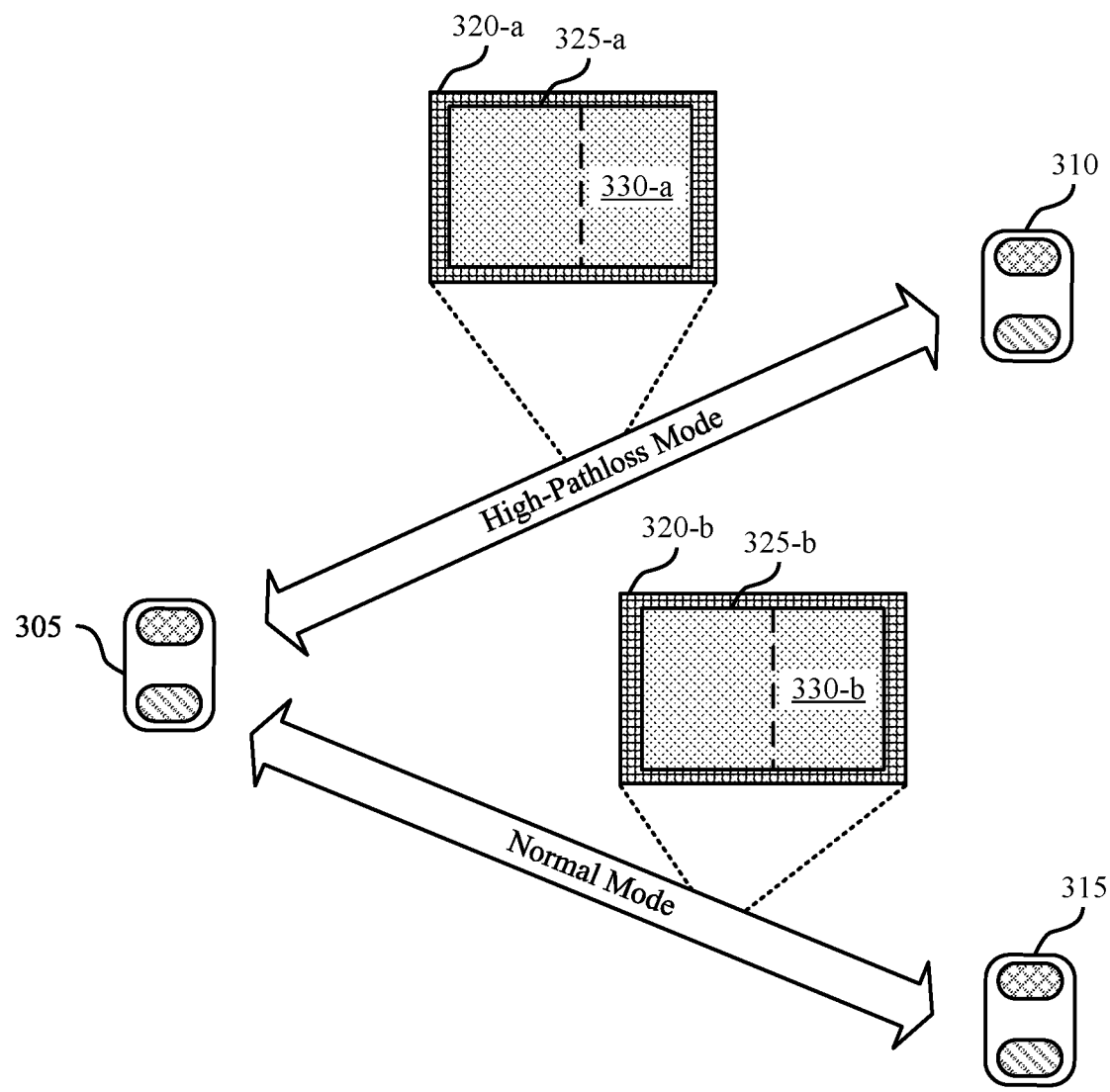

FIG. 3 illustrates an example of a wireless communications system 300 that supports communication configuration for high pathloss operations in accordance with one or more aspects of the present disclosure. In some examples, wireless communications system 300 may implement aspects of wireless communications systems 100 or 200. In some aspects, wireless communications system 300 may operate within an IAB network. For example, IAB nodes 305, 310, and 315 may be nodes within a larger IAB network, and IAB node 305 may communicate with IAB node 310 or IAB node 315 over wireless or wired backhaul links. IAB nodes 305, 310, and 315 may be examples of wireless devices, relay nodes, donor nodes, or IAB nodes as described herein.

Aspects of the described techniques enable support for wireless communications over a radio frequency spectrum band in a high pathloss environment by utilizing a high pathloss mode. The high pathloss mode may utilize various parameters (modulation and coding scheme (MCS), HARQ, aggregation level, RSs, etc.) that may be configured or otherwise selected to support wireless communications over the radio frequency spectrum band experiencing a pathloss that satisfies (or exceeds) a threshold pathloss value.

In some cases, wireless devices (e.g., IAB nodes 305, 310, or 315) may operate in one of more pathloss modes such as a high pathloss mode when the pathloss value satisfies (or exceeds) a threshold pathloss value or a normal (e.g., low) pathloss mode when the pathloss value is below the threshold pathloss value. For instance, one or more wireless devices may perform wireless communications in the wireless communications system 300 over a radio frequency spectrum band. In some aspects, this may include the wireless device(s) operating in a first pathloss mode (e.g., a low pathloss mode or normal mode) in the wireless communications system 300. The wireless device(s) may receive a signal that indicates that the pathloss value has satisfied (or exceeded) a threshold pathloss value. As one example, the wireless device(s) may monitor a channel of the radio frequency spectrum band (e.g., monitor signals being communicated over the channel) and determine that the pathloss value has satisfied (or exceeded) the threshold pathloss value. In another example, the wireless device(s) may receive a signal from another wireless device indicating that the pathloss value has satisfied (or exceeded) the threshold pathloss value. Accordingly, the wireless device(s) may switch from the first pathloss mode (e.g., a low pathloss mode) to a second pathloss mode (e.g., high pathloss mode) and continue to perform wireless communications. The second pathloss mode (e.g., the high pathloss mode) may include one or more parameters to support continued wireless communications in the high pathloss environment. Examples of the parameters that may be adjusted may include, but are not limited to, the length of the synchronization signal block (SSB) in the high pathloss mode being longer, the length of an RS in the high pathloss mode being longer, an MCS in the high pathloss mode being lower, and the like. Accordingly, the wireless devices may continue to perform wireless communications in the wireless communications system 300 in the high pathloss environment according to the second pathloss mode (e.g., the high pathloss mode).

As shown, IAB node 305 may communicate with IAB node 310 in a high pathloss mode (e.g., if the high pathloss mode is activated at IAB node 305 for these communications) and may communicate with IAB node 315 in a normal mode (e.g., if the high pathloss mode is deactivated at IAB node 305 for these other communications). An indication of which mode to use for communication may be transmitted from IAB node 305 to one or both of IAB nodes 310 and 315. For example, IAB node 305 may transmit a communication configuration 320-*a* to IAB node 310 to communicate in high pathloss mode. The communication configuration 320-*a* may instruct IAB node 310 to operate in the high pathloss mode for communications with IAB node 305. The communication configuration 320-*a* may include a BWP IE 325-*a* that indicates BWP parameters for the BWP used for communication between IAB node 305 and IAB node 310. In some examples, the communication configuration 320-*a* may include one or more additional bits 330-*a*, which may indicate the BWP identified by BWP IE 325-*a* is configured for high pathloss communications. As shown, the one or more additional bits 330-*a* may be a part of the BWP IE 325-*a*.

For normal mode operations, IAB node 305 may transmit a communication configuration 320-*b* to IAB node 315. The communication configuration 320-*b* may include a BWP IE 325-*b*, and one or more additional bits 330-*b*, which may be a part of the BWP IE 330-*b*. The one or more additional bits 330-*b* may indicate that the BWP identified by BWP IE 325-*b* is configured for normal mode communications. Based on the communication configuration(s) 320, the DU or MT functionality of an IAB node 305, 310, or 315 may be configured with different downlink or uplink BWPs for high pathloss mode and normal mode that may be activated based on the communication configuration(s) 320 sent to the respective IAB node 310 or 315. For example, IAB node 310 may perform communications using the high pathloss BWP identified by BWP IE 325-*a* upon reception (or after a duration following reception) of communication configuration 320-*a*.

In some cases, IAB node 305 may enter a high pathloss mode and may communicate with IAB node 310 after a given time interval. For example, the communication configuration 320-*a* may include timing information (e.g., an indication of a time interval that IAB node 310 is to wait before operating in high pathloss mode), and IAB node 305 may instruct IAB node 310 to activate a high pathloss BWP based on this timing information. In some cases, the BWP IE 325-*a* may include additional information (e.g., via the one or more additional bits 330-*a*) which indicates the BWP may be configured for the high pathloss mode, which signals to the MT of IAB node 310 to fully enter the high pathloss mode after a specific time and reduced, or no, additional signaling may be used for entering or exiting high pathloss mode.

In some aspects, configuration parameters of the communication configuration 320 may be configured differently between pathloss modes (e.g., a first subset of configuration parameters may be variable between high pathloss mode and normal mode, while a second subset of configuration parameters may be configured to be the same between high pathloss mode and normal mode). For example, control resource set (CORESET) parameters, CSI resources, and SRS resources may be different between high pathloss mode and normal mode. Further, if the one or more additional bits 330 correspond to a high pathloss mode (such as the one or more additional bits 330-*a*), a longer time duration for TTIs may be implemented for communications in the high pathloss mode as compared to the time duration associated with TTIs for normal mode. Additionally, or alternatively, rules specific to the high pathloss mode may be invoked (e.g., rules relating to procedures for interrupting data channels, such as a shared data channel, with an RS, such as a TRS).

In some cases, other parameters (e.g., a second subset of configuration parameters) may be configured to be the same between high pathloss and normal mode operations. For example, processing time related control parameters (e.g., latency parameters related to scheduling, parameters related to control operations) may remain the same for normal and high pathloss modes.

Figure 4:
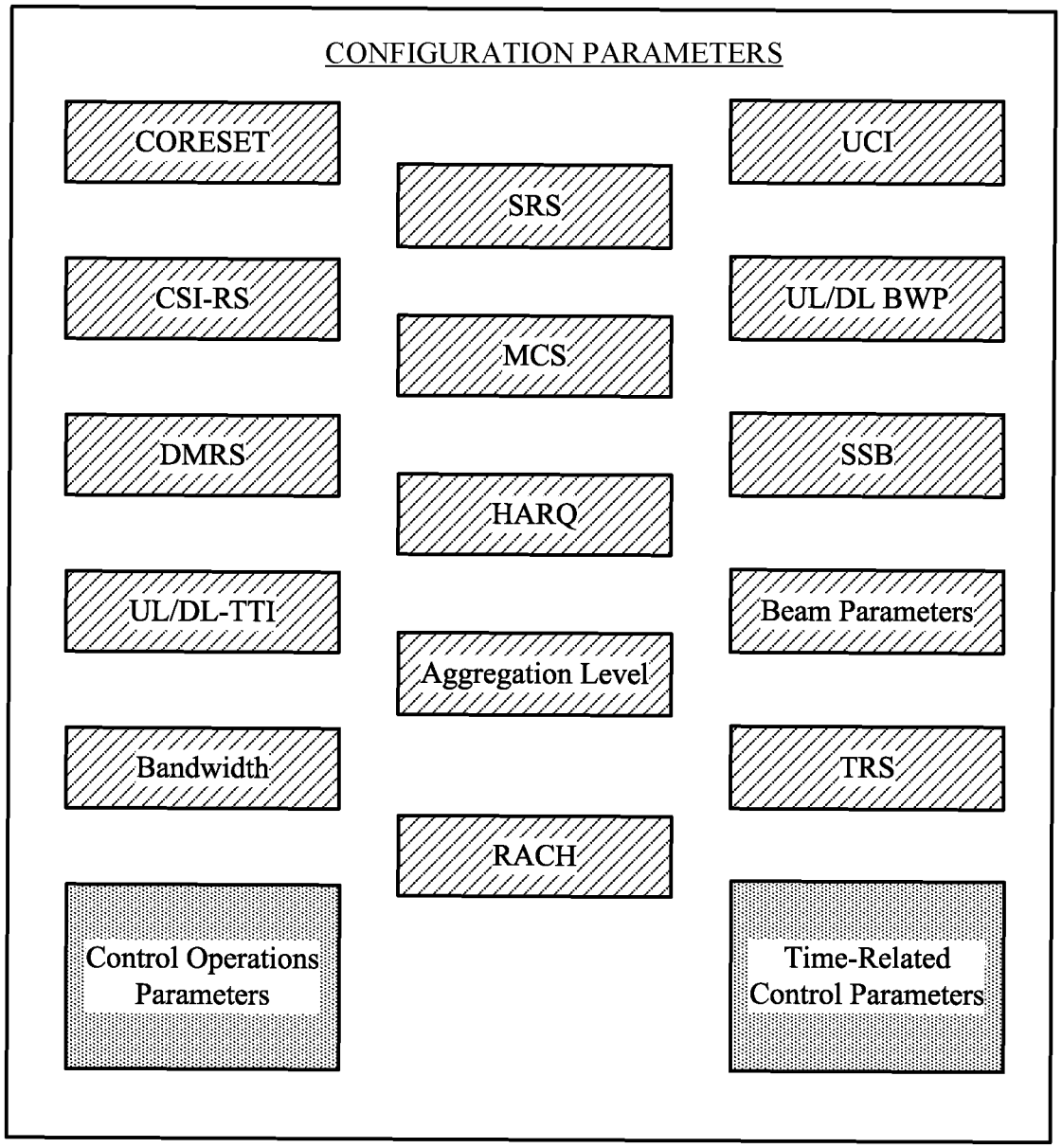
FIG. 4 illustrates example configuration parameters that support communication configuration for high pathloss operations in accordance with one or more aspects of the present disclosure.

FIG. 4 illustrates example configuration parameters 400 that supports communication configuration for high pathloss operations in accordance with one or more aspects of the present disclosure. In some examples, configuration parameters 400 may implement aspects of wireless communications systems 100, 200, or 300. Configuration parameters 400 may include a set of configuration parameters for configuring communications according to different pathloss modes.

In some examples, one or more configuration parameters 400 may be configured to support high pathloss mode communications (e.g., for devices operating in a high pathloss mode, such as a parent IAB node communicating with a child IAB node using a high pathloss communication link). Further, one or more configuration parameters 400 may be configured to support normal mode communications (e.g., for devices operating in a normal pathloss mode, such as a parent IAB node communicating with a child IAB node using a normal pathloss communication link).

In some cases, a subset of configuration parameters 400 may be configurable between pathloss modes. For example, one or more configuration parameters 400 may be variable or dynamic between pathloss modes, while other configuration parameters 400 may be static and remain the same between different pathloss modes. In one example, a subset of the configuration parameters 400 that may be different for high pathloss mode operation compared to normal mode operation. Such parameters may include CORESET parameters (e.g., CORESET #0 information or common CORESET information, CSI-RS parameters (e.g., CSI-RS resource configuration, periodicity, measurement information), and SRS parameters (e.g., SRS configuration, SRS resources). Other configurable parameters may include uplink control information (UCI) parameters (e.g., UCI resources), MCS parameters (e.g., modulation order, coding scheme), and uplink or downlink BWP parameters (control or data channel configuration parameters, frequency location, numerology, timing information, etc.). Demodulation RS (DMRS) parameters (DMRS resources or mapping type), HARQ parameters (HARQ feedback information such as #HARQ N1, MCS, etc.), SSB parameters (SSB position, periodicity, or power), uplink or downlink TTI information (e.g., uplink TTI duration and location, downlink TTI duration and location), aggregation level parameters, beam parameters (e.g., beam width or index), bandwidth parameters (cell RS ports, frequency information, etc.), TRS parameters (e.g., rules for interrupting PUSCH), and random access channel (RACH) parameters (e.g., RACH timing and resources), among others may also be configurable between different pathloss modes.

For example, one or more MCS parameters of the configuration parameters 400 may be configurable between pathloss modes. An MCS parameter may be associated with or include an MCS table with a number of entries (e.g., 16 entries). An entry may correspond to a coding rate or modulation order (e.g., quadrature phase shift keying (QPSK), quadrature amplitude modulation (QAM) formats such as QAM16, QAM 64, and the like). In some examples, the MCS table may be configurable based on a pathloss mode. For example, the MCS table used for a normal pathloss operation mode may be different from the MCS table used for a high pathloss operation mode. In some examples, the MCS tables may be different (e.g., each MCS table may include different entries) based on channel conditions. For example, an MCS table may include different entries based on a pathloss dynamic range (e.g., whether the pathloss dynamic range is associated with a normal pathloss operation mode or a high pathloss operation mode), a signal-to-interference-plus-noise ratio (SINR), or any other channel condition metrics.

In some examples, a wireless device (e.g., a base station 105 or a parent IAB node) may send a control transmission (e.g., a PDCCH transmission) to a receiving wireless device (e.g., a UE 115 or a child IAB node). The control transmission may schedule a shared channel transmission (e.g., a PDSCH transmission or a PUSCH transmission). The control transmission may also include DCI, which may indicate, to the receiving wireless device, one or more configuration parameters 400. For instance, the DCI may indicate the MCS parameter (e.g., an entry of the MCS table) to the receiving wireless device. The receiving wireless device may determine a coding rate and modulation order based on the indication in the DCI (e.g., the coding rate and modulation order associated with the indicated entry of the MCS table). The receiving wireless device may use the determined coding and modulation order to transmit or receive a scheduled shared channel transmission.

Other configuration parameters 400 may be configured similarly between high pathloss and normal modes. For example, configuration parameters 400 such as time-related control parameters (e.g., processing time related parameters, latency parameters, switching time parameters, scheduling parameters, or any combination of these or similar control parameters) may be similarly configured for both high pathloss and normal modes. Further, other control operation parameters, such as timing for beam change (e.g., timing between beam change command and the change of the beam), may be similarly configured for both high pathloss and normal modes.

Figure 5:
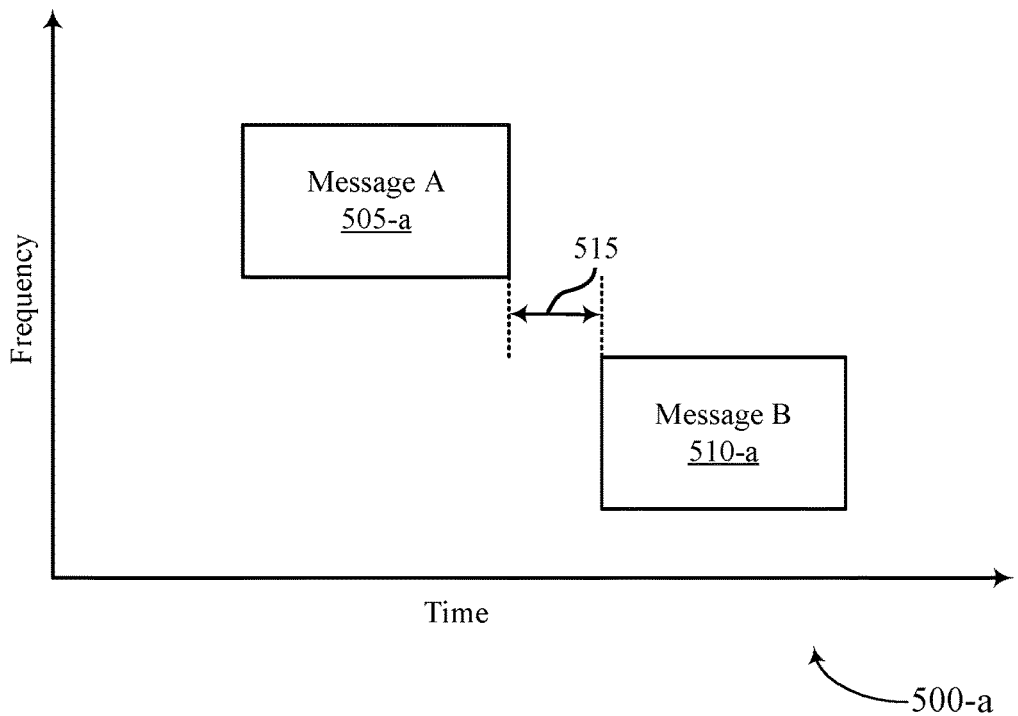
FIG. 5 illustrates example timing diagrams that support communication configuration for high pathloss operations in accordance with one or more aspects of the present disclosure.
Figure 5:
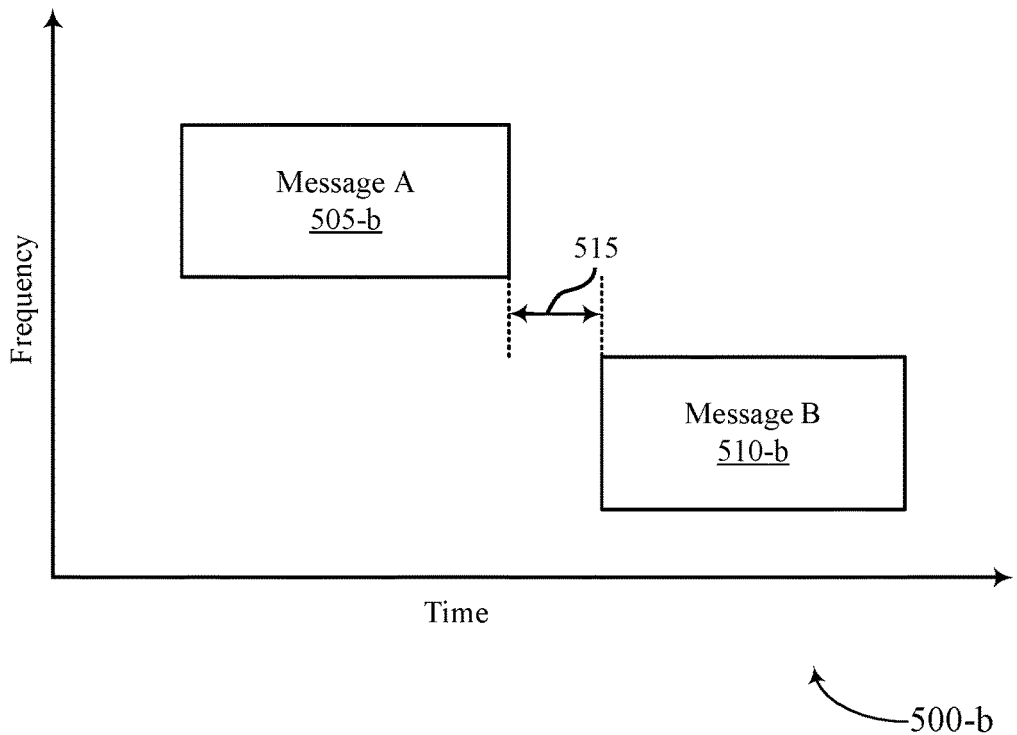

FIG. 5 illustrates example timing diagrams 500 that support communication configuration for high pathloss operations in accordance with one or more aspects of the present disclosure. In some examples, timing diagrams 500 may implement aspects of wireless communications systems 100, 200, or 300. Timing diagrams 500 may be representative of timings for communications of one or more messages between a transmitting device and a receive device, each of which may be a wireless device in an IAB network. As illustrated in timing diagrams 500, which are associated with different pathloss modes, some communication configuration parameters (e.g., TTI duration) may be different for different pathloss modes, while other communication configuration parameters (e.g., processing time) may be the same between modes.

As shown, timing diagram 500-a may be associated with a normal operation mode (e.g., a normal pathloss mode) and shows two messages, Message A 505-a and Message B 510-a, that may be exchanged between two devices. According to timing diagram 500-a, a first wireless device (e.g., a parent IAB node) may transmit or receive Message A 505-a and in turn, a second wireless device (e.g., a child IAB node) may transmit or receive Message B 510-a after a time period 515. Timing diagram 500-b may be associated with a high pathloss operation mode (e.g., a high pathloss mode) and shows two messages, Message A 505-b and Message B 510-b, that may be exchanged between two devices. According to timing diagram 500-b, a first wireless device (e.g., a parent IAB node) may transmit or receive Message A 505-b and in turn, a second wireless device (e.g., a child IAB node) may transmit or receive Message B 510-b after a time period 515, which may be the same as time period 515 in timing diagram 500-a.

In some cases, time period 515 may correspond to one or more processing time related control parameters (e.g., latency parameters related to scheduling, data, and feedback for communications between two devices). In another example, time period 515 may correspond to control operations (e.g., the time from a transmitting beam change command to the command taking effect). As illustrated by timing diagrams 500, the processing time related control operations or other control operations may not change between operation modes (e.g., time period 515 may be equal in both the high pathloss mode and the normal mode).

Message A 505 and Message B 510 may each be associated with different message types or communication scenarios and although transmission duration for each of the messages may be longer in high pathloss mode compared to normal mode, other parameters (e.g., processing time, switching time) may be similar in both modes. In some cases, the duration for time period 515 may be based on capabilities of the devices exchanging Message A 505 and Message B.

In one example, Message A 505 may be a PDCCH that schedules a corresponding downlink data channel (e.g., PDSCH) or uplink data channel (e.g., PUSCH), represented by Message B. In both high pathloss mode and normal mode as shown by timing diagrams 500-a and 500-b, the time period 515 between receipt of the PDCCH and the transmission of the PDSCH or PUSCH scheduled by the PDCCH remains the same.

Figure 6:
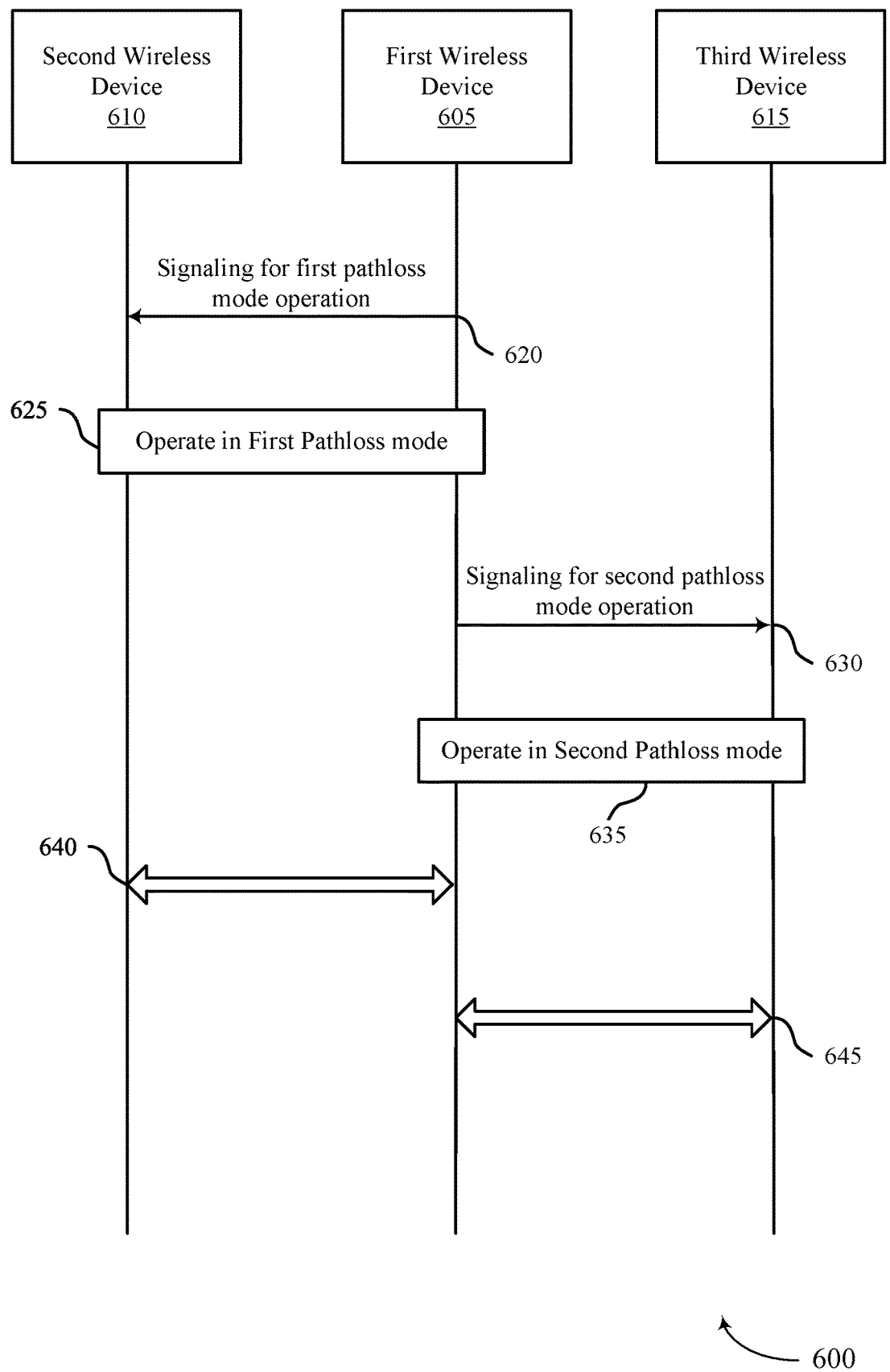
FIG. 6 illustrates an example of a process flow that supports communication configuration for high pathloss operations in accordance with one or more aspects of the present disclosure.

In another example, Message A 505 may be a PUSCH or a PDSCH and Message B 510 may be a control channel (e.g., PUCCH or PDCCH) associated with feedback for Message A 505. In such instances, Message A 505 may be transmitted to a receiving device, and the receiving device may generate feedback based on whether Message A 505 was received successfully. The receiving device may transmit Message B 510 containing the generated feedback information for Message A 505 after time period 515, which may be similar for both normal and high pathloss modes. Here, the time period 515 between transmission of a data channel (e.g., PDSCH or PUSCH), Message A 505, and transmission of a control channel (e.g., PUCCH, PDCCH), Message B 510, carrying feedback information for the data channel may be fixed FIG. 6 illustrates an example of a process flow 600 that supports communication configuration for high pathloss operations in accordance with one or more aspects of the present disclosure. In some examples, process flow 600 may implement aspects of wireless communications systems 100, 200, or 300. Aspects of process flow 600 may be implemented by a first wireless device 605, a second wireless device 610, and a third wireless device 615, each of which may be examples of an IAB node, a base station, or a UE, as described herein. Aspects of process flow 600 may be implemented over a wireless network, such as a mmW radio frequency spectrum band and first wireless device 605, second wireless device 610, and third wireless device 615 may be part of an IAB network.

At 620, the first wireless device 605 may transmit a signal indicating a communication configuration for operation in a first mode, such as a pathloss mode (e.g., a high pathloss mode), to a second wireless device 610. The communication configuration may be transmitted via RRC signaling and may include an indication of a BWP, an SSB, or a combination configured for high pathloss communications between the first wireless device 605 and the second wireless device 610. In some examples, the communication configuration may include a BWP IE, which may include one or more bits, specifying that the BWP is configured for high pathloss mode and also may indicate that the second wireless device 610 is to enter high pathloss mode after a given time.

At 625, the first wireless device 605 and the second wireless device 610 may operate (e.g., performing wireless communications) in a first pathloss mode in a wireless network over a radio frequency spectrum band. Operating in the first pathloss mode such as a high pathloss mode may involve communications between the first wireless device 605 and the second wireless device 610 over a BWP configured for the high pathloss mode. In some cases, the first pathloss mode may have associated configuration parameters such as an associated first MCS, an associated first bandwidth, an associated first beam width, and the like, which may be the same or different between modes.

At 630, the first wireless device 605 may transmit a signal indicating a configuration for a communications configuration in a second mode, such as a second pathloss mode (e.g., a normal pathloss mode), to a third wireless device 615. The communication configuration may be transmitted via RRC signaling and may include an indication of a BWP, and SSB, or a combination configured for normal communications between the first wireless device 605 and the third wireless device 615. In some examples, the communication configuration may include a BWP IE, which may include one or more bits, specifying that the BWP is configured for normal pathloss mode and also may indicate that the third wireless device 615 is to enter normal pathloss mode after a given time.

At 635, the first wireless device 605 and the third wireless device 615 may operate (e.g., performing wireless communications) in a second pathloss mode in a wireless network over a radio frequency spectrum band. Operating in the second pathloss mode such as a normal pathloss mode may involve communications between the first wireless device 605 and the third wireless device 615 over a BWP configured for the normal pathloss mode. In some cases, the second pathloss mode may have associated configuration parameters such as an associated first MCS, an associated first bandwidth, an associated first beam width, and the like, which may be the same or different than corresponding parameters of the first pathloss mode.

At 640, the first wireless device 605 and the second wireless device 610 may communicate via a normal mode BWP. Likewise, at 645 the first wireless device 605 and the third wireless device 615 may communicate via a high pathloss BWP.

It is to be understood that the second wireless device 610 may switch from the first pathloss mode to the second pathloss mode (e.g., based on signaling from the first wireless device 605) and the third wireless device 615 may switch to the first pathloss mode from the second pathloss mode.

Figure 7:
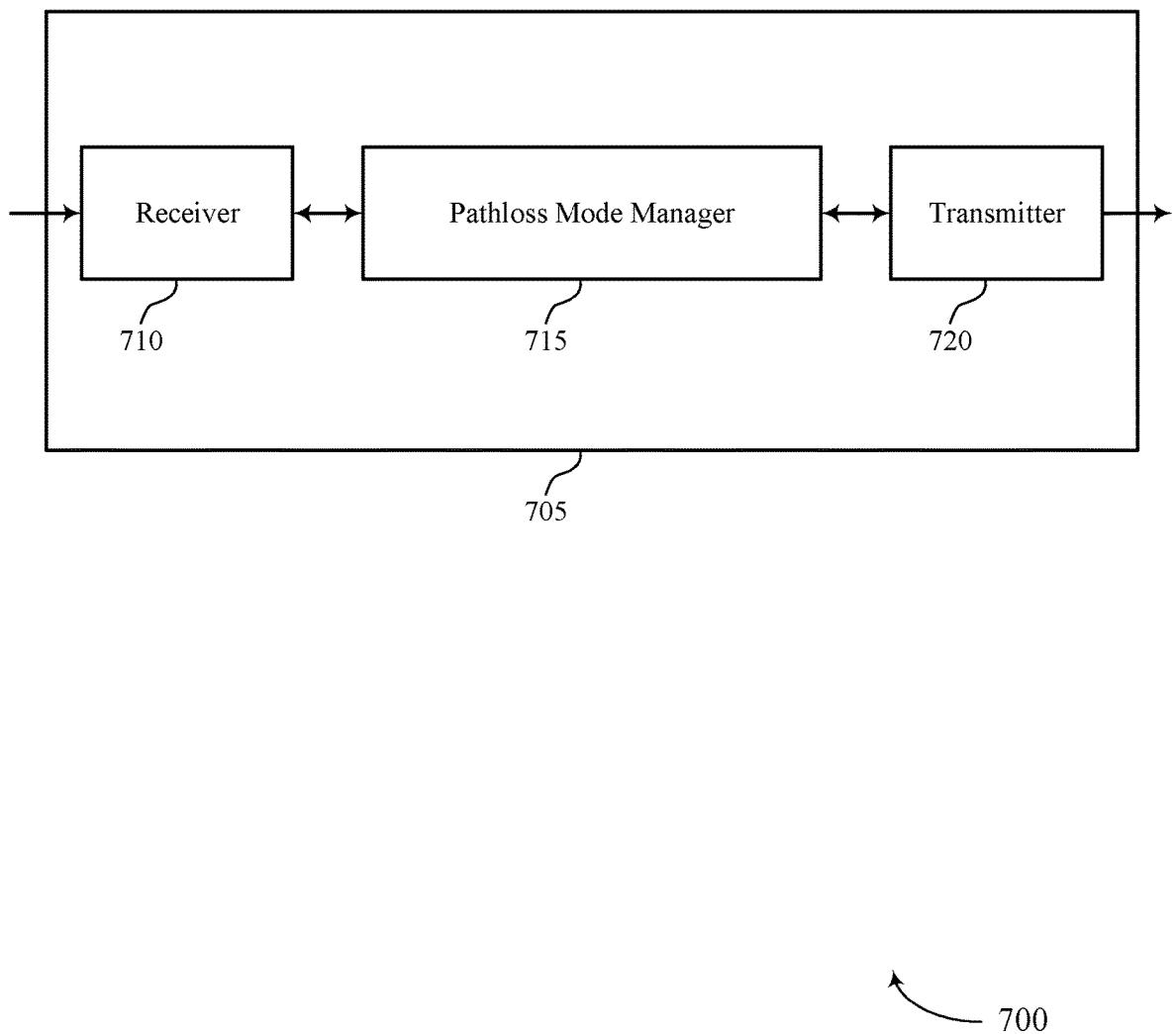
FIGS. 7 and 8 show block diagrams of devices that support communication configuration for high pathloss operations in accordance with one or more aspects of the present disclosure.

FIG. 7 shows a block diagram 700 of a device 705 that supports communication configuration for high pathloss operations in accordance with one or more aspects of the present disclosure. The device 705 may be an example of aspects of an IAB node, a UE 115, or base station 105 as described herein. The device 705 may include a receiver 710, a pathloss mode manager 715, and a transmitter 720. The device 705 may also include a processor. Each of these components may be in communication with one another (e.g., via one or more buses).

Receiver 710 may receive information such as packets, user data, or control information associated with various information channels (control channels, data channels, and information related to communication configuration for high pathloss operations, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The pathloss mode manager 715 may identify a communication configuration for a second wireless device, the communication configuration indicating one or more configuration parameters for a BWP associated with a first pathloss mode, transmit an indication of the communication configuration to the second wireless device for operating in the first pathloss mode, where a first length of a first TTI associated with the first pathloss mode is different from a second length of a second TTI associated with a second pathloss mode, and communicate with the second wireless device operating in the first pathloss mode via the BWP based on the one or more configuration parameters for the BWP.

Additionally, or alternatively, the pathloss mode manager 715 may receive, from a second wireless device, an indication of a communication configuration for operating in a first pathloss mode, the communication configuration indicating one or more configuration parameters for a BWP associated with the first pathloss mode and communicate with the second wireless device in the first pathloss mode via the BWP based on the one or more configuration parameters for the BWP, where a first length of a first TTI associated with the first pathloss mode is different from a second length of a second TTI associated with a second pathloss mode.

Additionally, or alternatively, the pathloss mode manager 715 may identify a communication configuration for a second wireless device, the communication configuration including one or more configuration parameters for a BWP associated with a first pathloss mode and communicate with the second wireless device via the BWP according to the first pathloss mode based on the one or more configuration parameters, where a first length of a first TTI associated with the first pathloss mode is different from a second length of a second TTI associated with a second pathloss mode. The pathloss mode manager 715 may be an example of aspects of the pathloss mode manager 1010 or 1110 as described herein.

The actions performed by the pathloss mode manager 715 as described herein may support improvements in signaling overhead related to switching from a high pathloss mode to a normal mode. In one or more aspects, a parent node entering a high pathloss mode may send an indication to a second device to activate a high pathloss communication configuration. The indication may allow the second device to enable a high pathloss mode, which may result in more efficient communications (e.g., decreased latency in the system), among other improvements.

Based on a parent device signaling a mode to a second device as described herein, a processor of a wireless node (e.g., a processor controlling the receiver 710, the pathloss mode manager 715, the transmitter 720, or a combination thereof) may improve complexity while ensuring relatively efficient communications. For example, a second node following a parent node in mode switching may realize reduced signaling overhead and power savings, among other benefits.

The pathloss mode manager 715, or its sub-components, may be implemented in hardware, code (e.g., software or firmware) executed by a processor, or any combination thereof. If implemented in code executed by a processor, the functions of the pathloss mode manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The pathloss mode manager 715, or its sub-components, may be physically located at various positions, including being distributed such that portions of functions are implemented at different physical locations by one or more physical components. In some examples, the pathloss mode manager 715, or its sub-components, may be a separate and distinct component in accordance with various aspects of the present disclosure. In some examples, the pathloss mode manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
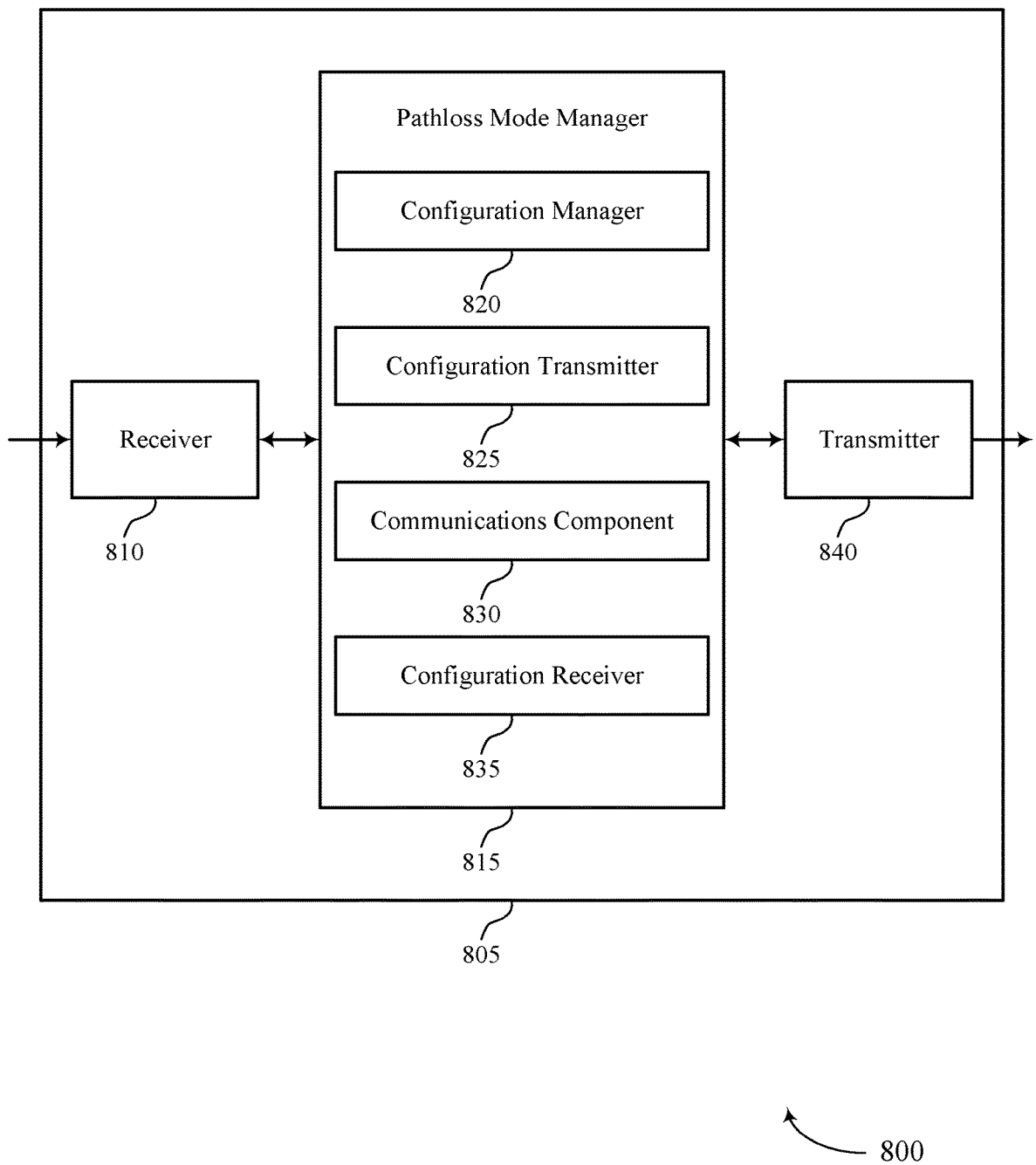

FIG. 8 shows a block diagram 800 of a device 805 that supports communication configuration for high pathloss operations in accordance with one or more aspects of the present disclosure. The device 805 may be an example of aspects of a device 705, a UE 115, or a base station 105 as described herein. The device 805 may include a receiver 810, a pathloss mode manager 815, and a transmitter 840. The device 805 may also include a processor. Each of these components may be in communication with one another (e.g., via one or more buses).

Receiver 810 may receive information such as packets, user data, or control information associated with various information channels (control channels, data channels, and information related to communication configuration for high pathloss operations, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The pathloss mode manager 815 may be an example of aspects of the pathloss mode manager 715 as described herein. The pathloss mode manager 815 may include a configuration manager 820, a configuration transmitter 825, a communications component 830, and a configuration receiver 835. The pathloss mode manager 815 may be an example of aspects of the pathloss mode manager 1010 or 1110 as described herein.

In some examples (e.g., when acting as a parent node in an IAB network), the configuration manager 820 may identify a communication configuration for a second wireless device, the communication configuration indicating one or more configuration parameters for a BWP associated with a first pathloss mode. The configuration transmitter 825 may transmit an indication of the communication configuration to the second wireless device for operating in the first pathloss mode, where a first length of a first TTI associated with the first pathloss mode is different from a second length of a second TTI associated with a second pathloss mode. The communications component 830 may communicate with the second wireless device operating in the first pathloss mode via the BWP based on the one or more configuration parameters for the BWP.

In some examples (e.g., when acting as a child node in an IAB network), the configuration receiver 835 may receive, from a second wireless device, an indication of a communication configuration for operating in a first pathloss mode, the communication configuration indicating one or more configuration parameters for a BWP associated with the first pathloss mode. The communications component 830 may communicate with the second wireless device in the first pathloss mode via the BWP based on the one or more configuration parameters for the BWP, where a first length of a first TTI associated with the first pathloss mode is different from a second length of a second TTI associated with a second pathloss mode.

In some examples (e.g., when acting as a parent or child node in an IAB network), the configuration manager 820 may identify a communication configuration for a second wireless device, the communication configuration including one or more configuration parameters for a BWP associated with a first pathloss mode. The communications component 830 may communicate with the second wireless device via the BWP according to the first pathloss mode based on the one or more configuration parameters, where a first length of a first TTI associated with the first pathloss mode is different from a second length of a second TTI associated with a second pathloss mode.

Transmitter 840 may transmit signals generated by other components of the device 805. In some examples, the transmitter 840 may be collocated with a receiver 810 in a transceiver module. For example, the transmitter 840 may be an example of aspects of the transceiver 1020 or 1120 as described with reference to FIGS. 10 and 11. The transmitter 840 may utilize a single antenna or a set of antennas.

Figure 9:
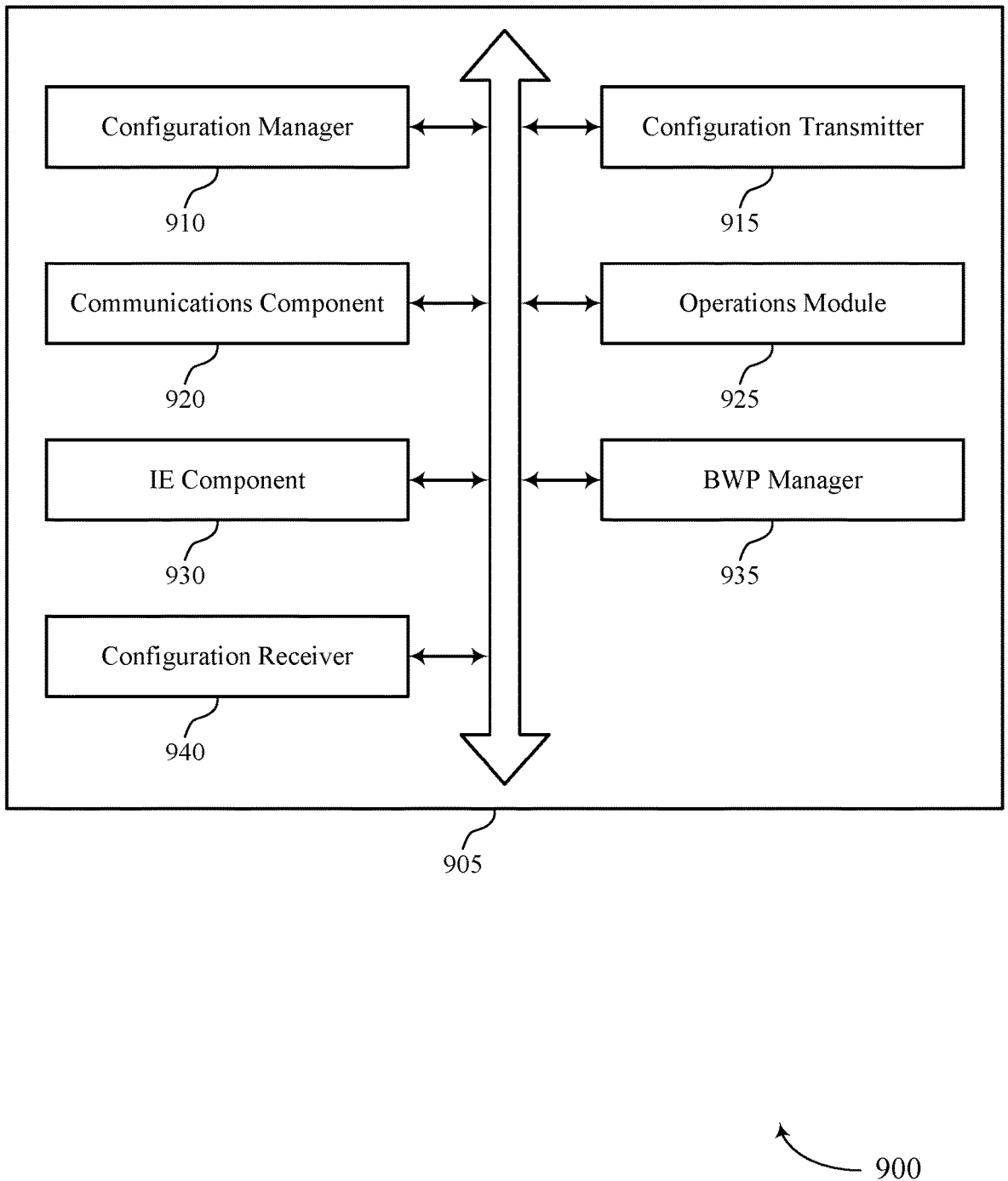
FIG. 9 shows a block diagram of a pathloss mode manager that supports communication configuration for high pathloss operations in accordance with one or more aspects of the present disclosure.

FIG. 9 shows a block diagram 900 of a pathloss mode manager 905 that supports communication configuration for high pathloss operations in accordance with one or more aspects of the present disclosure. The pathloss mode manager 905 may be an example of aspects of a pathloss mode manager 715, a pathloss mode manager 815, or a pathloss mode manager 1010 described herein. The pathloss mode manager 905 may include a configuration manager 910, a configuration transmitter 915, a communications component 920, an operations module 925, an IE component 930, a BWP manager 935, and a configuration receiver 940. Each of these modules may communicate, directly or indirectly, with one another (e.g., via one or more buses).

The configuration manager 910 may identify a communication configuration for a second wireless device, the communication configuration indicating one or more configuration parameters for a BWP associated with a first pathloss mode. In some cases, the first wireless device and the second wireless device are IAB nodes operating in an IAB network. In some examples, the one or more configuration parameters include at least one of control resource set information, CSI resources, SRS resources, a TTI duration, TRS information, or any combination thereof associated with the BWP. In some aspects, at least one of the one or more configuration parameters are the same as one or more configuration parameters for a second BWP associated with the second pathloss mode. In some instances, a processing time parameter, a transmission beam parameter, a latency parameter, or any combination thereof of the one or more configuration parameters is the same as a corresponding parameter of the one or more configuration parameters for the second BWP.

The configuration transmitter 915 may transmit an indication of the communication configuration to the second wireless device for operating in the first pathloss mode, where a first length of a first TTI associated with the first pathloss mode is different from a second length of a second TTI associated with a second pathloss mode. In some examples, the configuration transmitter 915 may transmit the indication of the communication configuration to the second wireless device for the second wireless device to communicate via the BWP based on operating in the first pathloss mode. In some aspects, the configuration transmitter 915 may transmit the indication of the communication configuration via RRC signaling or DCI. In some cases, the first pathloss mode is a high pathloss mode and the second pathloss mode is a normal mode. In some instances, the first length of the first TTI associated with the first pathloss mode is longer than the second length of the second TTI associated with the second pathloss mode.

The communications component 920 may communicate with the second wireless device operating in the first pathloss mode via the BWP based on the one or more configuration parameters for the BWP. In some examples, the communications component 920 may communicate with the second wireless device in the first pathloss mode via the BWP based on the one or more configuration parameters for the BWP, where a first length of a first TTI associated with the first pathloss mode is different from a second length of a second TTI associated with a second pathloss mode. In some aspects, the communications component 920 may communicate with the second wireless device via the BWP according to the first pathloss mode based on the one or more configuration parameters, where a first length of a first TTI associated with the first pathloss mode is different from a second length of a second TTI associated with a second pathloss mode. In some examples, the communications component 920 may communicate with the second wireless device via the BWP after a time duration indicated by the communication configuration. In some cases, the communications component 920 may communicate via the BWP after a time duration indicated by the communication configuration. In some instances, the communications component 920 may communicate with the second wireless device via the BWP after a time duration after entering the first pathloss mode.

The configuration receiver 940 may receive, from a second wireless device, an indication of a communication configuration for operating in a first pathloss mode, the communication configuration indicating one or more configuration parameters for a BWP associated with the first pathloss mode. In some examples, the configuration receiver 940 may receive the indication of the communication configuration to communicate via the BWP based on the first wireless device operating in the first pathloss mode. In some cases, the configuration receiver 940 may receive the indication of the communication configuration via RRC signaling or DCI.

The operations module 925 may operate in the first pathloss mode for communications with the second wireless device. In some examples, the operations module 925 may enter the first pathloss mode for communications with the second wireless device.

The IE component 930 may transmit an IE for the BWP in the one or more configuration parameters, the IE indicating that the BWP is configured for the first pathloss mode. In some examples, the IE component 930 may identify an IE associated with the BWP in the one or more configuration parameters, the IE indicating that the BWP is configured for the first pathloss mode. In some cases, the one or more configuration parameters includes at least one of control resource set information, CSI resources, SRS resources, a TTI duration, TRS information, or any combination thereof associated with the BWP. In some aspects, the IE includes a single bit field. In some instances, at least a portion of the one or more configuration parameters are the same as one or more configuration parameters for a second BWP associated with the second pathloss mode. In some cases, a processing time parameter, a transmission beam parameter, a latency parameter, or any combination thereof of the one or more configuration parameters is the same as a corresponding parameter of the one or more configuration parameters for the second BWP. In some cases, the one or more configuration parameters includes at least one of control resource set information, CSI resources, SRS resources, a TTI duration, TRS information, or any combination thereof associated with the BWP.

The BWP manager 935 may configure the BWP for the second wireless device for communications in the first pathloss mode, the BWP including one of a downlink BWP or an uplink BWP. In some examples, the BWP manager 935 may configure a second BWP for the second wireless device for communications in the second pathloss mode. In some cases, the BWP manager 935 may configure the BWP for the second wireless device for communications in the first pathloss mode based on the one or more configuration parameters for the BWP.

Figure 10:
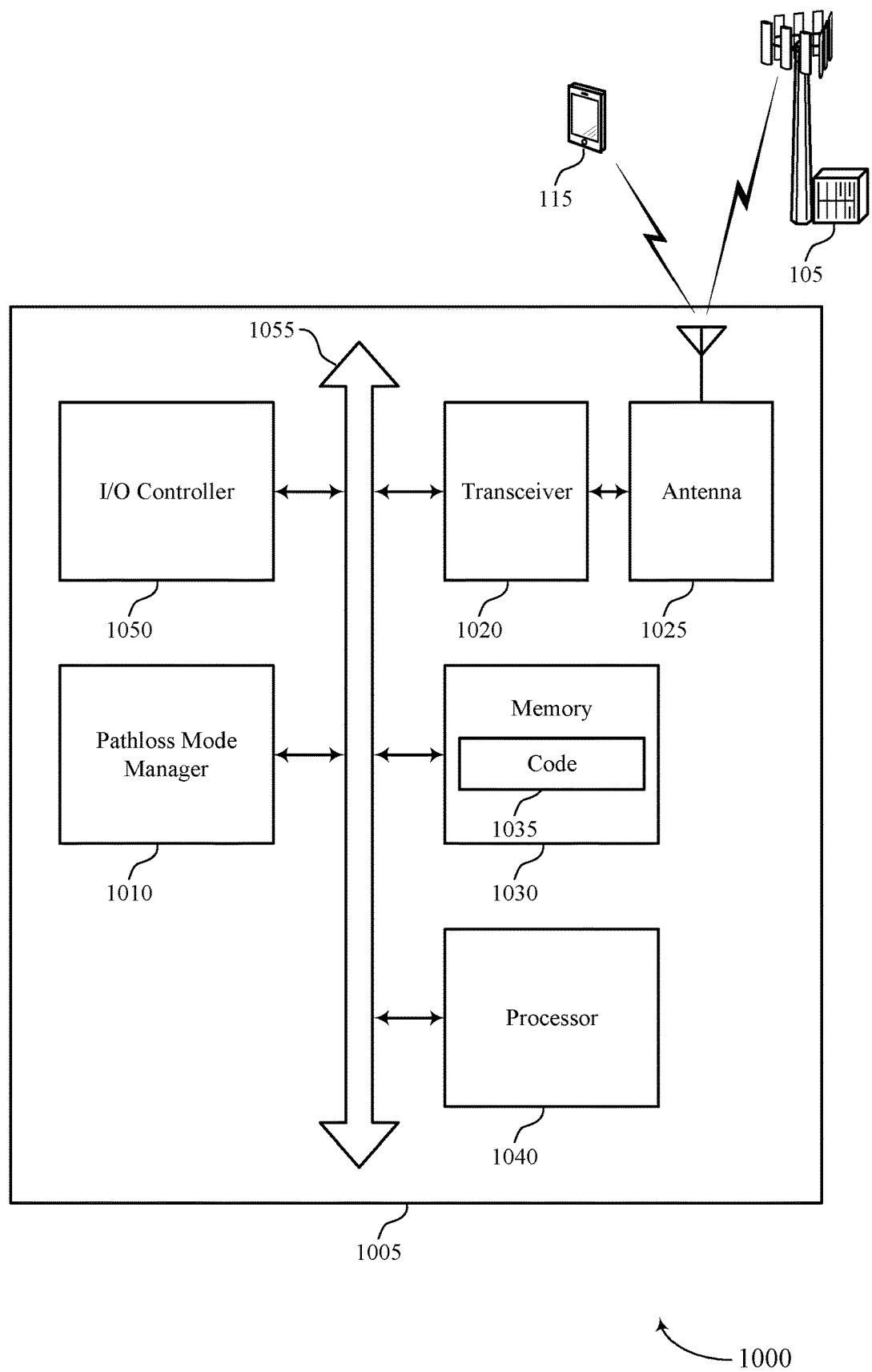
FIG. 10 shows a diagram of a system including a UE that supports communication configuration for high pathloss operations in accordance with one or more aspects of the present disclosure.

FIG. 10 shows a diagram of a system 1000 including a device 1005 that supports communication configuration for high pathloss operations in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a pathloss mode manager 1010, a transceiver 1020, an antenna 1025, memory 1030, a processor 1040, and an I/O controller 1050. These components may be in electronic communication via one or more buses (e.g., bus 1055).

The pathloss mode manager 1010 may identify a communication configuration for a second wireless device, the communication configuration indicating one or more configuration parameters for a BWP associated with a first pathloss mode, transmit an indication of the communication configuration to the second wireless device for operating in the first pathloss mode, where a first length of a first TTI associated with the first pathloss mode is different from a second length of a second TTI associated with a second pathloss mode, and communicate with the second wireless device operating in the first pathloss mode via the BWP based on the one or more configuration parameters for the BWP.

Additionally, or alternatively, the pathloss mode manager 1010 may receive, from a second wireless device, an indication of a communication configuration for operating in a first pathloss mode, the communication configuration indicating one or more configuration parameters for a BWP associated with the first pathloss mode and communicate with the second wireless device in the first pathloss mode via the BWP based on the one or more configuration parameters for the BWP, where a first length of a first TTI associated with the first pathloss mode is different from a second length of a second TTI associated with a second pathloss mode.

Additionally, or alternatively, the pathloss mode manager 1010 may identify a communication configuration for a second wireless device, the communication configuration including one or more configuration parameters for a BWP associated with a first pathloss mode and communicate with the second wireless device via the BWP according to the first pathloss mode based on the one or more configuration parameters, where a first length of a first TTI associated with the first pathloss mode is different from a second length of a second TTI associated with a second pathloss mode.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1005 may include a single antenna 1025, or the device 1005 may have more than one antenna 1025, which may be capable of concurrently transmitting or receiving multiple wireless transmissions.

The memory 1030 may include random access memory (RAM), read only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting communication configuration for high pathloss operations).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
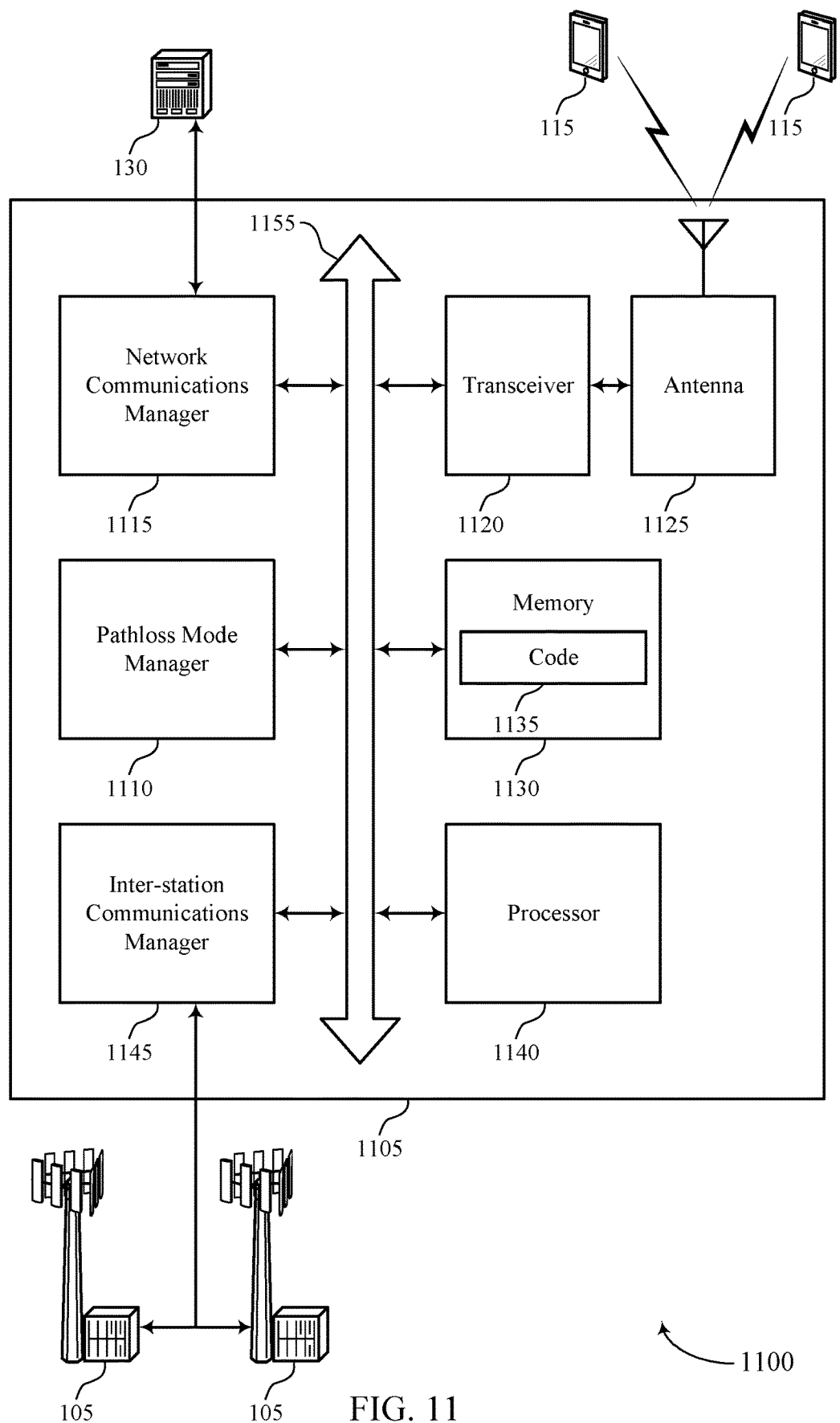
FIG. 11 shows a diagram of a system including a base station that supports communication configuration for high pathloss operations in accordance with one or more aspects of the present disclosure.

FIG. 11 shows a diagram of a system 1100 including a device 1105 that supports communication configuration for high pathloss operations in accordance with one or more aspects of the present disclosure. The device 1105 may be an example of or include the components of device 705, device 805, or a base station 105 as described herein. The device 1105 may include components for bi-directional voice and data communications including components for transmitting and receiving communications, including a pathloss mode manager 1110, a network communications manager 1115, a transceiver 1120, an antenna 1125, memory 1130, a processor 1140, and an inter-station communications manager 1145. These components may be in electronic communication via one or more buses (e.g., bus 1155).

The pathloss mode manager 1110 may identify a communication configuration for a second wireless device, the communication configuration indicating one or more configuration parameters for a BWP associated with a first pathloss mode, transmit an indication of the communication configuration to the second wireless device for operating in the first pathloss mode, where a first length of a first TTI associated with the first pathloss mode is different from a second length of a second TTI associated with a second pathloss mode, and communicate with the second wireless device operating in the first pathloss mode via the BWP based on the one or more configuration parameters for the BWP.

Additionally, or alternatively, the pathloss mode manager 1110 may also receive, from a second wireless device, an indication of a communication configuration for operating in a first pathloss mode, the communication configuration indicating one or more configuration parameters for a BWP associated with the first pathloss mode and communicate with the second wireless device in the first pathloss mode via the BWP based on the one or more configuration parameters for the BWP, where a first length of a first TTI associated with the first pathloss mode is different from a second length of a second TTI associated with a second pathloss mode.

Additionally, or alternatively, the pathloss mode manager 1110 may also identify a communication configuration for a second wireless device, the communication configuration including one or more configuration parameters for a BWP associated with a first pathloss mode and communicate with the second wireless device via the BWP according to the first pathloss mode based on the one or more configuration parameters, where a first length of a first TTI associated with the first pathloss mode is different from a second length of a second TTI associated with a second pathloss mode.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the device 1105 may include a single antenna 1125, or the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting communication configuration for high pathloss operations).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
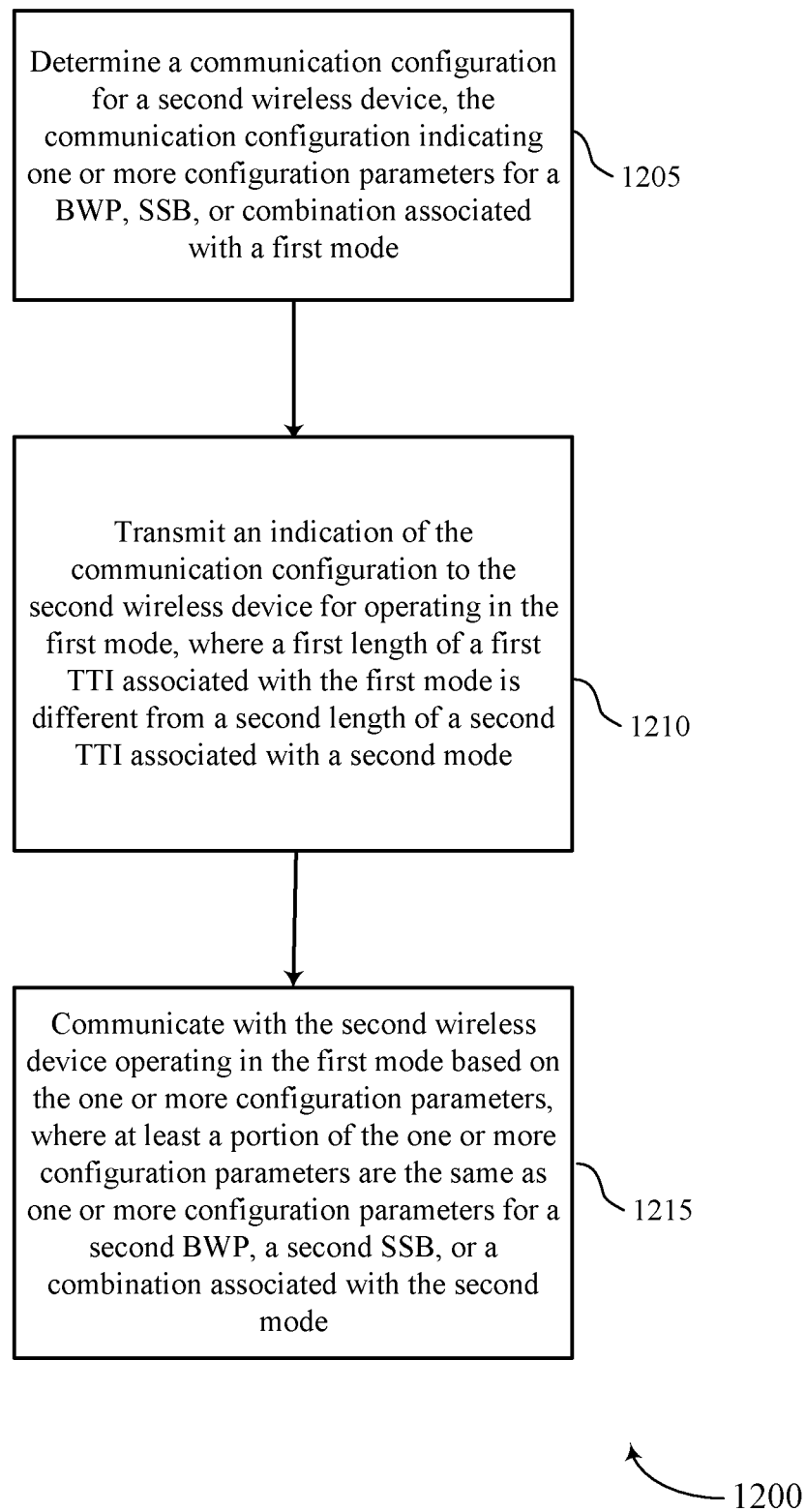
FIGS. 12 through 18 show flowcharts illustrating methods that support communication configuration for high pathloss operations in accordance with one or more aspects of the present disclosure.

FIG. 12 shows a flowchart illustrating a method 1200 that supports communication configuration for high pathloss operations in accordance with one or more aspects of the present disclosure. The operations of method 1200 may be implemented by a UE 115 or base station 105 or its components as described herein. For example, the operations of method 1200 may be performed by a pathloss mode manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may identify a communication configuration for a second wireless device, the communication configuration indicating one or more configuration parameters for a BWP associated with a first pathloss mode. The operations of 1205 may be performed according to the methods described herein. In some examples, aspects of the operations of 1205 may be performed by a configuration manager as described with reference to FIGS. 7 through 11.

At 1210, the UE or base station may transmit an indication of the communication configuration to the second wireless device for operating in the first pathloss mode, where a first length of a first TTI associated with the first pathloss mode is different from a second length of a second TTI associated with a second pathloss mode. The operations of 1210 may be performed according to the methods described herein. In some examples, aspects of the operations of 1210 may be performed by a configuration transmitter as described with reference to FIGS. 7 through 11.

At 1215, the UE or base station may communicate with the second wireless device operating in the first pathloss mode via the BWP based on the one or more configuration parameters for the BWP, where at least a portion of the one or more configuration parameters are the same as one or more configuration parameters for a second BWP associated with the second pathloss mode. For example, a processing time parameter, a transmission beam parameter, a latency parameter, or any combination thereof of the one or more configuration parameters may be the same as a corresponding parameter of the one or more configuration parameters for the second BWP. The operations of 1215 may be performed according to the methods described herein. In some examples, aspects of the operations of 1215 may be performed by a communications component as described with reference to FIGS. 7 through 11.

Figure 13:
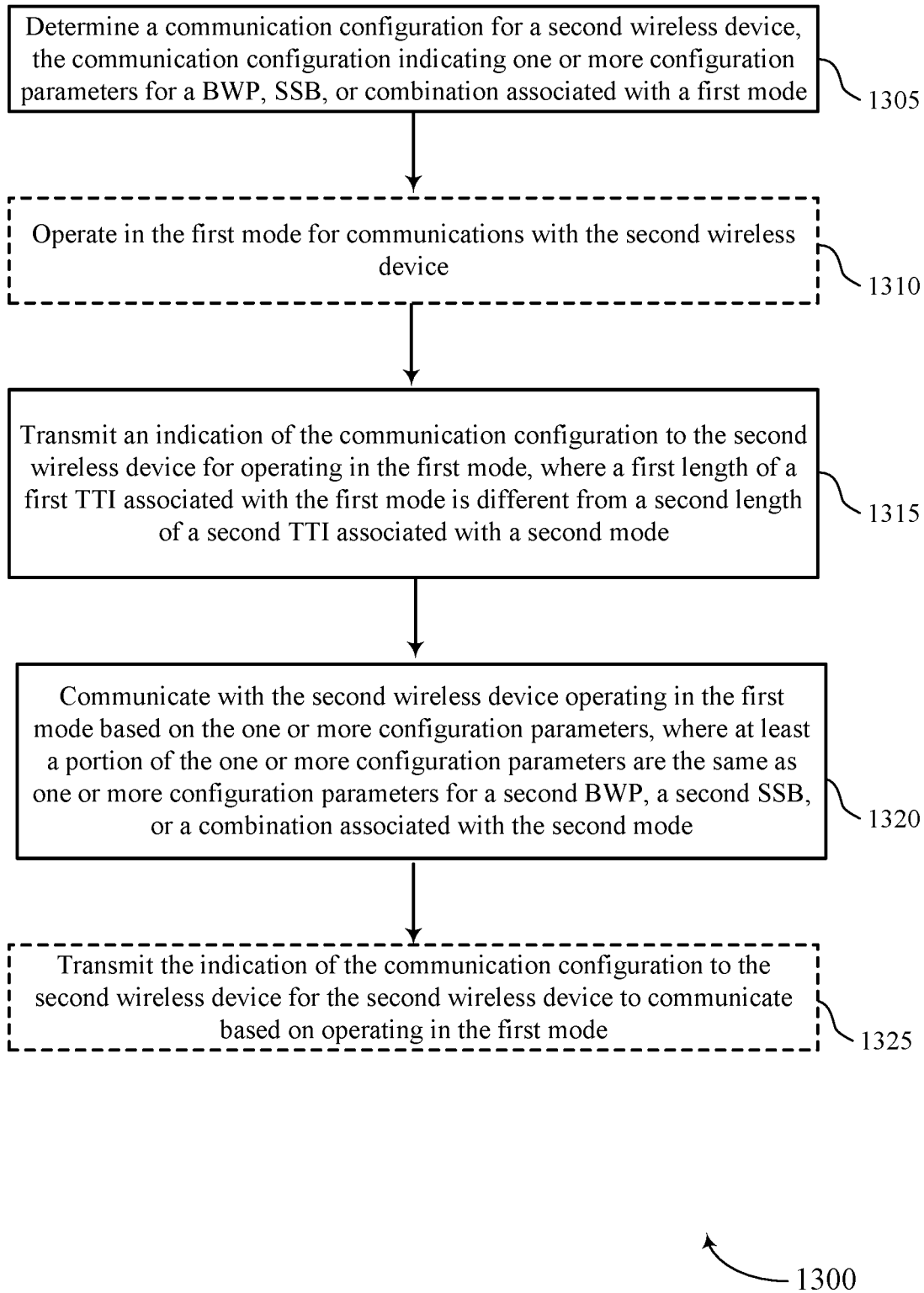

FIG. 13 shows a flowchart illustrating a method 1300 that supports communication configuration for high pathloss operations in accordance with one or more aspects of the present disclosure. The operations of method 1300 may be implemented by a UE 115 or base station 105 or its components as described herein. For example, the operations of method 1300 may be performed by a pathloss mode manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may identify a communication configuration for a second wireless device, the communication configuration indicating one or more configuration parameters for a BWP associated with a first pathloss mode. The operations of 1305 may be performed according to the methods described herein. In some examples, aspects of the operations of 1305 may be performed by a configuration manager as described with reference to FIGS. 7 through 11.

At 1310, the UE or base station may operate in the first pathloss mode for communications with the second wireless device. The operations of 1310 may be performed according to the methods described herein. In some examples, aspects of the operations of 1310 may be performed by an operations module as described with reference to FIGS. 7 through 11.

At 1315, the UE or base station may transmit an indication of the communication configuration to the second wireless device for operating in the first pathloss mode, where a first length of a first TTI associated with the first pathloss mode is different from a second length of a second TTI associated with a second pathloss mode. The operations of 1315 may be performed according to the methods described herein. In some examples, aspects of the operations of 1315 may be performed by a configuration transmitter as described with reference to FIGS. 7 through 11.

At 1320, the UE or base station may communicate with the second wireless device operating in the first pathloss mode via the BWP based on the one or more configuration parameters for the BWP, where at least a portion of the one or more configuration parameters are the same as one or more configuration parameters for a second BWP associated with the second pathloss mode. For example, a processing time parameter, a transmission beam parameter, a latency parameter, or any combination thereof of the one or more configuration parameters may be the same as a corresponding parameter of the one or more configuration parameters for the second BWP. The operations of 1320 may be performed according to the methods described herein. In some examples, aspects of the operations of 1320 may be performed by a communications component as described with reference to FIGS. 7 through 11.

At 1325, the UE or base station may transmit the indication of the communication configuration to the second wireless device for the second wireless device to communicate via the BWP based on operating in the first pathloss mode. The operations of 1325 may be performed according to the methods described herein. In some examples, aspects of the operations of 1325 may be performed by a configuration transmitter as described with reference to FIGS. 7 through 11.

Figure 14:
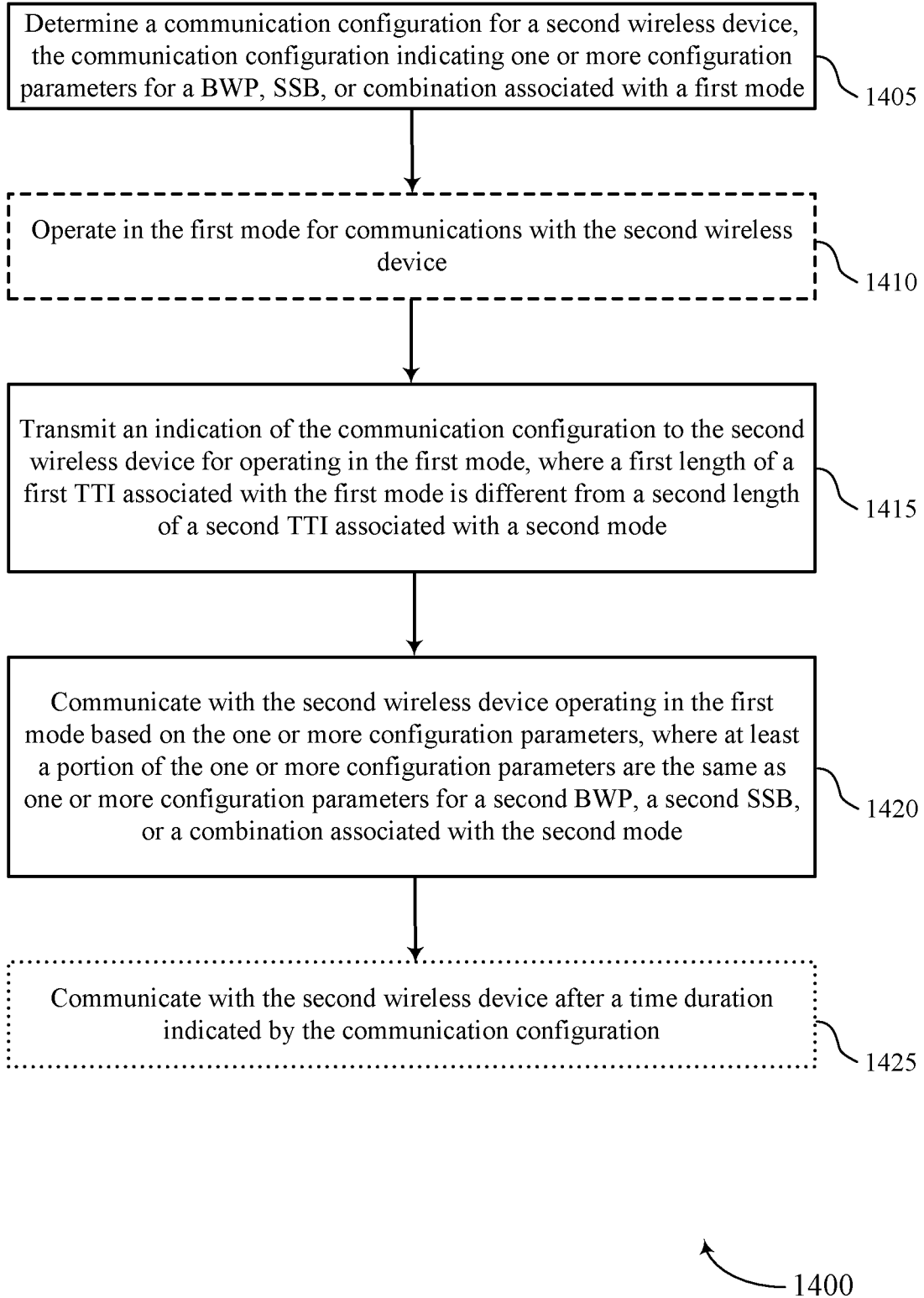

FIG. 14 shows a flowchart illustrating a method 1400 that supports communication configuration for high pathloss operations in accordance with one or more aspects of the present disclosure. The operations of method 1400 may be implemented by a UE 115 or base station 105 or its components as described herein. For example, the operations of method 1400 may be performed by a pathloss mode manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may identify a communication configuration for a second wireless device, the communication configuration indicating one or more configuration parameters for a BWP associated with a first pathloss mode. The operations of 1405 may be performed according to the methods described herein. In some examples, aspects of the operations of 1405 may be performed by a configuration manager as described with reference to FIGS. 7 through 11.

At 1410, the UE or base station may operate in the first pathloss mode for communications with the second wireless device. The operations of 1410 may be performed according to the methods described herein. In some examples, aspects of the operations of 1410 may be performed by an operations module as described with reference to FIGS. 7 through 11.

At 1415, the UE or base station may transmit an indication of the communication configuration to the second wireless device for operating in the first pathloss mode, where a first length of a first TTI associated with the first pathloss mode is different from a second length of a second TTI associated with a second pathloss mode. The operations of 1415 may be performed according to the methods described herein. In some examples, aspects of the operations of 1415 may be performed by a configuration transmitter as described with reference to FIGS. 7 through 11.

At 1420, the UE or base station may communicate with the second wireless device operating in the first pathloss mode via the BWP based on the one or more configuration parameters for the BWP, where at least a portion of the one or more configuration parameters are the same as one or more configuration parameters for a second BWP associated with the second pathloss mode. For example, a processing time parameter, a transmission beam parameter, a latency parameter, or any combination thereof of the one or more configuration parameters may be the same as a corresponding parameter of the one or more configuration parameters for the second BWP. The operations of 1420 may be performed according to the methods described herein. In some examples, aspects of the operations of 1420 may be performed by a communications component as described with reference to FIGS. 7 through 11.

At 1425, the UE or base station may communicate with the second wireless device via the BWP after a time duration indicated by the communication configuration. The operations of 1425 may be performed according to the methods described herein. In some examples, aspects of the operations of 1425 may be performed by a communications component as described with reference to FIGS. 7 through 11.

Figure 15:
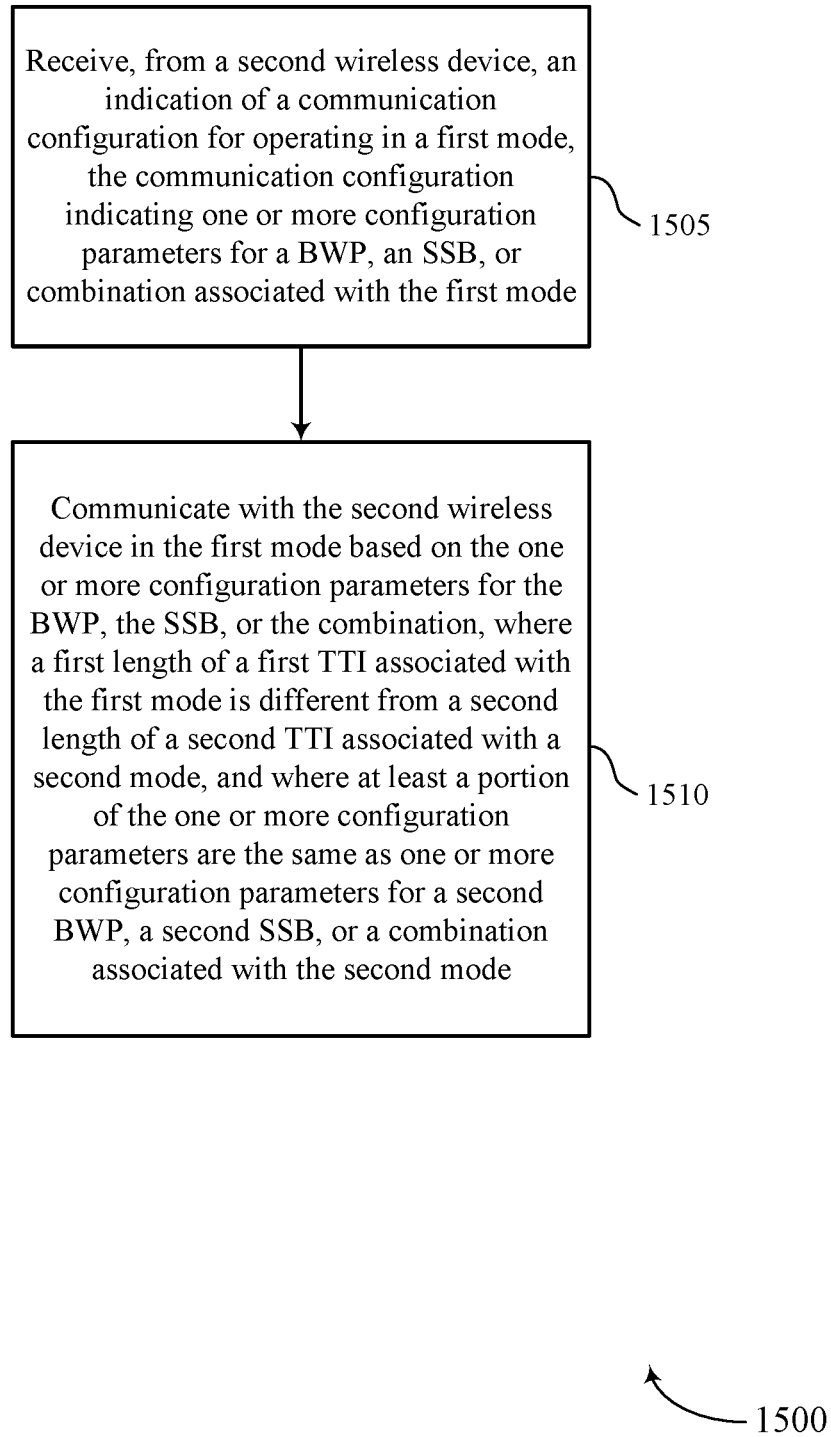

FIG. 15 shows a flowchart illustrating a method 1500 that supports communication configuration for high pathloss operations in accordance with one or more aspects of the present disclosure. The operations of method 1500 may be implemented by a UE 115 or base station 105 or its components as described herein. For example, the operations of method 1500 may be performed by a pathloss mode manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may receive, from a second wireless device, an indication of a communication configuration for operating in a first pathloss mode, the communication configuration indicating one or more configuration parameters for a BWP associated with the first pathloss mode. The operations of 1505 may be performed according to the methods described herein. In some examples, aspects of the operations of 1505 may be performed by a configuration receiver as described with reference to FIGS. 7 through 11.

At 1510, the UE or base station may communicate with the second wireless device in the first pathloss mode via the BWP based on the one or more configuration parameters for the BWP, where a first length of a first TTI associated with the first pathloss mode is different from a second length of a second TTI associated with a second pathloss mode, and where at least a portion of the one or more configuration parameters are the same as one or more configuration parameters for a second BWP associated with the second pathloss mode. For example, a processing time parameter, a transmission beam parameter, a latency parameter, or any combination thereof of the one or more configuration parameters may be the same as a corresponding parameter of the one or more configuration parameters for the second BWP. The operations of 1510 may be performed according to the methods described herein. In some examples, aspects of the operations of 1510 may be performed by a communications component as described with reference to FIGS. 7 through 11.

Figure 16:
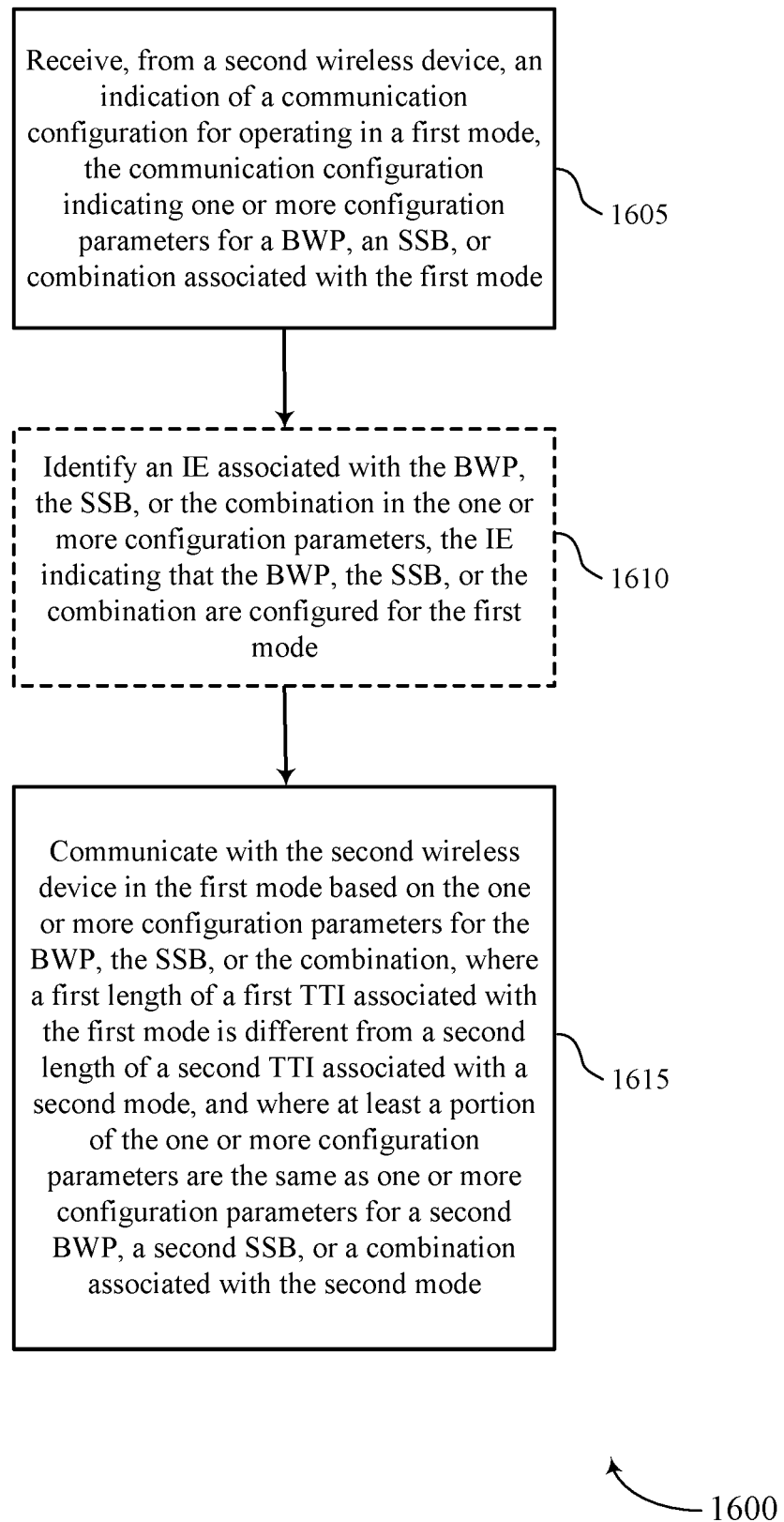

FIG. 16 shows a flowchart illustrating a method 1600 that supports communication configuration for high pathloss operations in accordance with one or more aspects of the present disclosure. The operations of method 1600 may be implemented by a UE 115 or base station 105 or its components as described herein. For example, the operations of method 1600 may be performed by a pathloss mode manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may receive, from a second wireless device, an indication of a communication configuration for operating in a first pathloss mode, the communication configuration indicating one or more configuration parameters for a BWP associated with the first pathloss mode. The operations of 1605 may be performed according to the methods described herein. In some examples, aspects of the operations of 1605 may be performed by a configuration receiver as described with reference to FIGS. 7 through 11.

At 1610, the UE or base station may identify an IE associated with the BWP in the one or more configuration parameters, the IE indicating that the BWP is configured for the first pathloss mode. The operations of 1610 may be performed according to the methods described herein. In some examples, aspects of the operations of 1610 may be performed by an IE component as described with reference to FIGS. 7 through 11.

At 1615, the UE or base station may communicate with the second wireless device in the first pathloss mode via the BWP based on the one or more configuration parameters for the BWP, where a first length of a first TTI associated with the first pathloss mode is different from a second length of a second TTI associated with a second pathloss mode, and where at least a portion of the one or more configuration parameters are the same as one or more configuration parameters for a second BWP associated with the second pathloss mode. For example, a processing time parameter, a transmission beam parameter, a latency parameter, or any combination thereof of the one or more configuration parameters may be the same as a corresponding parameter of the one or more configuration parameters for the second BWP. The operations of 1615 may be performed according to the methods described herein. In some examples, aspects of the operations of 1615 may be performed by a communications component as described with reference to FIGS. 7 through 11.

Figure 17:
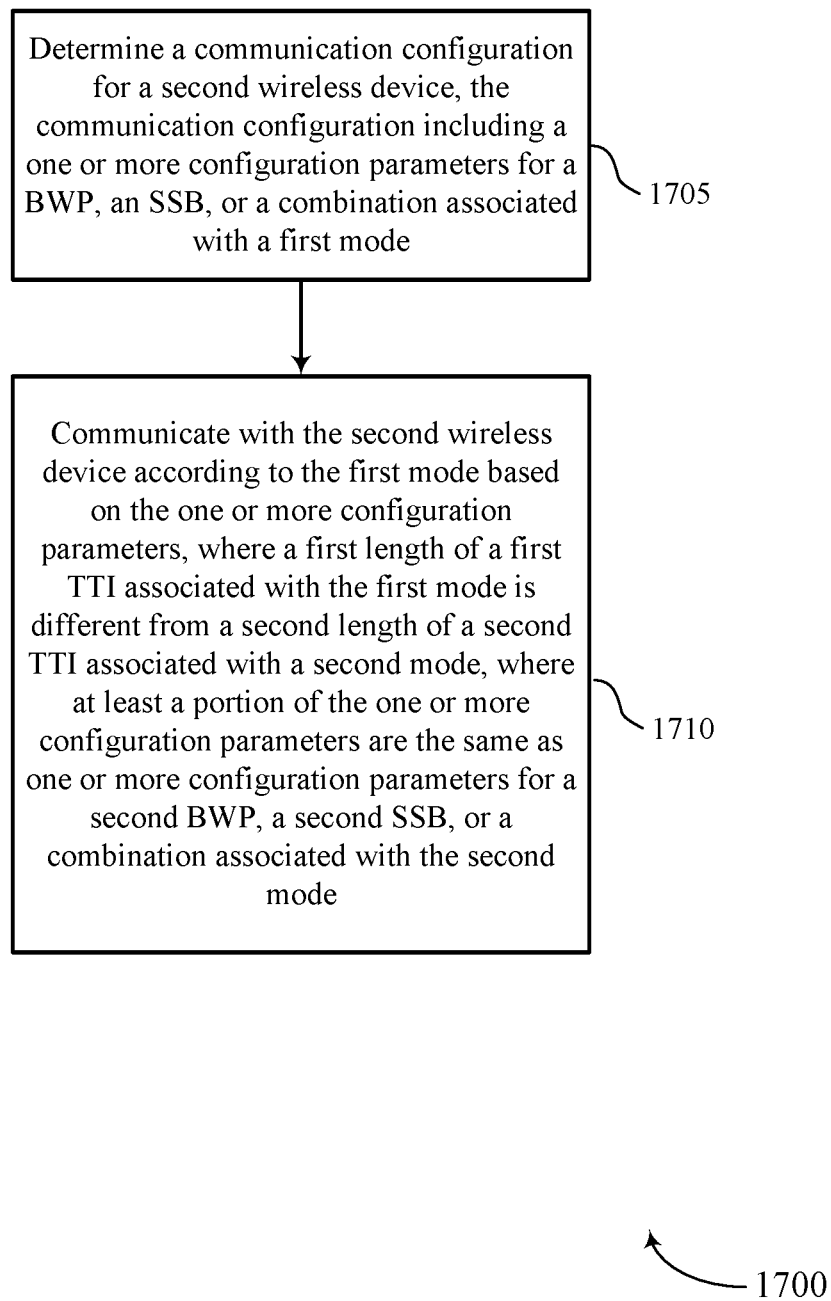

FIG. 17 shows a flowchart illustrating a method 1700 that supports communication configuration for high pathloss operations in accordance with one or more aspects of the present disclosure. The operations of method 1700 may be implemented by a UE 115 or base station 105 or its components as described herein. For example, the operations of method 1700 may be performed by a pathloss mode manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1705, the UE or base station may identify a communication configuration for a second wireless device, the communication configuration including one or more configuration parameters for a BWP associated with a first pathloss mode. The operations of 1705 may be performed according to the methods described herein. In some examples, aspects of the operations of 1705 may be performed by a configuration manager as described with reference to FIGS. 7 through 11.

At 1710, the UE or base station may communicate with the second wireless device via the BWP according to the first pathloss mode based on the one or more configuration parameters, where a first length of a first TTI associated with the first pathloss mode is different from a second length of a second TTI associated with a second pathloss mode, and where at least a portion of the one or more configuration parameters are the same as one or more configuration parameters for a second BWP associated with the second pathloss mode. For example, a processing time parameter, a transmission beam parameter, a latency parameter, or any combination thereof of the one or more configuration parameters may be the same as a corresponding parameter of the one or more configuration parameters for the second BWP. The operations of 1710 may be performed according to the methods described herein. In some examples, aspects of the operations of 1710 may be performed by a communications component as described with reference to FIGS. 7 through 11.

Figure 18:
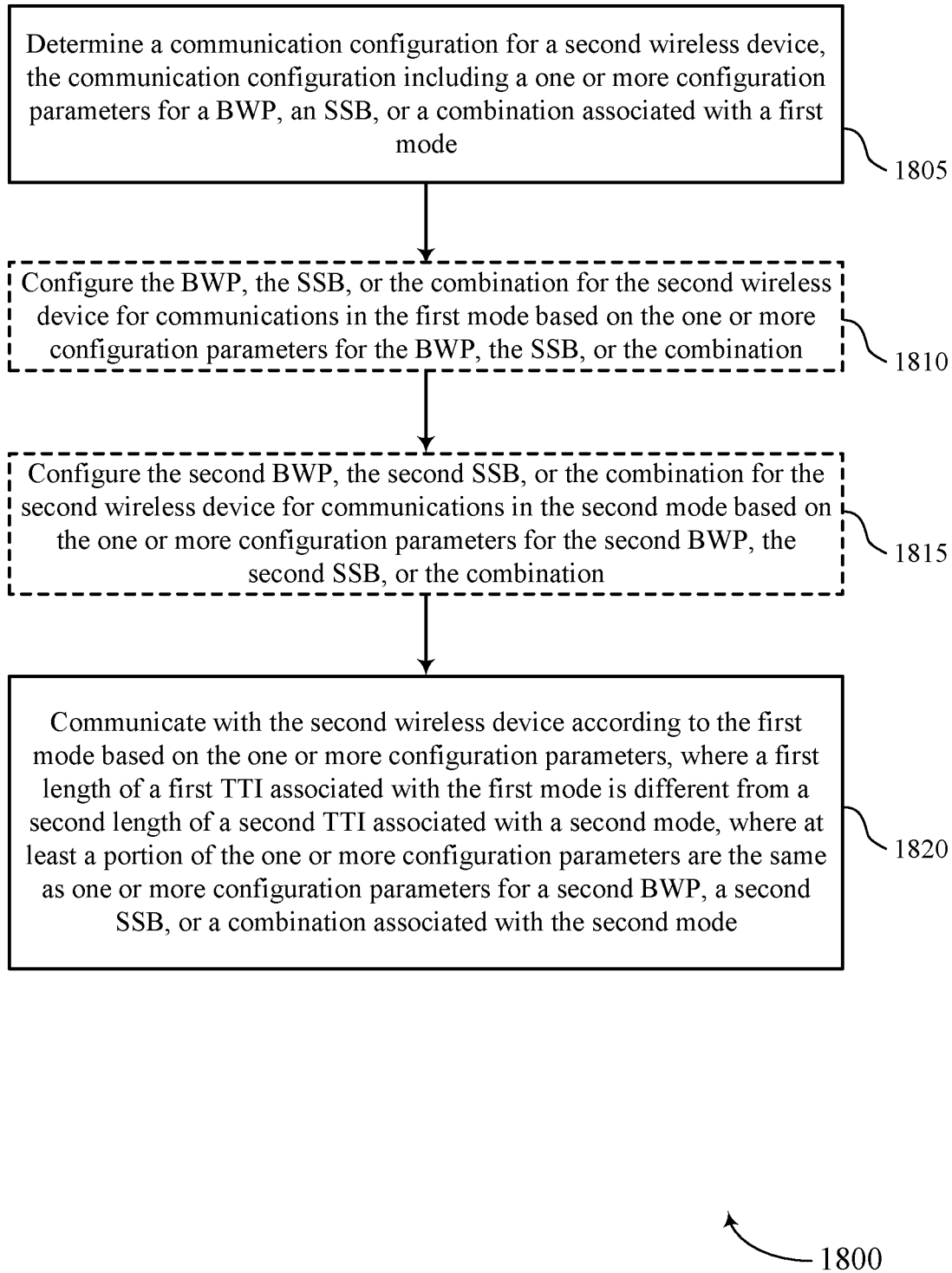

FIG. 18 shows a flowchart illustrating a method 1800 that supports communication configuration for high pathloss operations in accordance with one or more aspects of the present disclosure. The operations of method 1800 may be implemented by a UE 115 or base station 105 or its components as described herein. For example, the operations of method 1800 may be performed by a pathloss mode manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1805, the UE or base station may identify a communication configuration for a second wireless device, the communication configuration including one or more configuration parameters for a BWP associated with a first pathloss mode. The operations of 1805 may be performed according to the methods described herein. In some examples, aspects of the operations of 1805 may be performed by a configuration manager as described with reference to FIGS. 7 through 11.

At 1810, the UE or base station may configure the BWP for the second wireless device for communications in the first pathloss mode based on the one or more configuration parameters for the BWP. The operations of 1810 may be performed according to the methods described herein. In some examples, aspects of the operations of 1810 may be performed by a BWP manager as described with reference to FIGS. 7 through 11.

At 1815, the UE or base station may configure the second BWP for the second wireless device for communications in the second pathloss mode based on the one or more configuration parameters for the second BWP. The operations of 1815 may be performed according to the methods described herein. In some examples, aspects of the operations of 1815 may be performed by a BWP manager as described with reference to FIGS. 7 through 11.

At 1820, the UE or base station may communicate with the second wireless device via the BWP according to the first pathloss mode based on the one or more configuration parameters, where a first length of a first TTI associated with the first pathloss mode is different from a second length of a second TTI associated with a second pathloss mode, and where at least a portion of the one or more configuration parameters are the same as one or more configuration parameters for a second BWP associated with the second pathloss mode. For example, a processing time parameter, a transmission beam parameter, a latency parameter, or any combination thereof of the one or more configuration parameters may be the same as a corresponding parameter of the one or more configuration parameters for the second BWP. The operations of 1820 may be performed according to the methods described herein. In some examples, aspects of the operations of 1820 may be performed by a communications component as described with reference to FIGS. 7 through 11.

It should be noted that the methods described herein describe possible implementations, and that the operations and the steps may be rearranged or otherwise modified and that other implementations are possible. Further, aspects from two or more of the methods may be combined.

Example 1: A method for wireless communications at a first wireless device, comprising: determining a communication configuration for a second wireless device, the communication configuration indicating one or more configuration parameters for a BWP, a length of an SSB, or a combination thereof, associated with a first mode; transmitting an indication of the communication configuration to the second wireless device for operating in the first mode, wherein a first length of a first TTI associated with the first mode is different from a second length of a second TTI associated with a second mode; and communicating with the second wireless device operating in the first mode based at least in part on the one or more configuration parameters.

Example 2: The method of example 1, wherein: the first mode is a first pathloss mode; and the second mode is a second pathloss mode.

Example 3: The method of example 2, wherein the first pathloss mode is a high pathloss mode and the second pathloss mode is a normal mode.

Example 4: The method of example 1 to 3, further comprising: operating in the first mode for communications with the second wireless device; and transmitting the indication of the communication configuration to the second wireless device for the second wireless device to communicate based at least in part on operating in the first mode.

Example 5: The method of example 4, further comprising: communicating with the second wireless device after a time duration indicated by the communication configuration.

Example 6: The method of example 1 to 5, further comprising: transmitting an information element for at least one of the BWP, the SSB, or the combination thereof, in the one or more configuration parameters, the information element indicating that at least one of the BWP, the SSB, or the combination thereof, is configured for the first mode.

Example 7: The method of example 6, wherein the one or more configuration parameters comprises at least one of control resource set information, channel state information resources, sounding reference signal resources, a TTI duration, tracking reference signal information, or any combination thereof associated with at least one of the BWP, the SSB, or the combination thereof.

Example 8: The method of example 6, wherein the information element comprises a single bit field.

Example 9: The method of example 6, wherein: at least a portion of the one or more configuration parameters are the same as one or more configuration parameters for at least one of a second BWP, a second length of an SSB, or a combination thereof, associated with the second mode; and a processing time parameter, a transmission beam parameter, a latency parameter, or any combination thereof of the one or more configuration parameters is the same as a corresponding parameter of the one or more configuration parameters for at least one of the second BWP, the second SSB, or the combination thereof.

Example 10: The method of claims 1 to 9, further comprising: transmitting the indication of the communication configuration via RRC signaling or DCI or both.

Example 11: The method of example 1 to 10, further comprising: configuring the BWP for the second wireless device for communications in the first mode, the BWP comprising one of a downlink BWP or an uplink BWP, wherein the configuration parameters are for the BWP; and configuring a second BWP for the second wireless device for communications in the second mode.

Example 12: The method of example 1 to 11, wherein the first wireless device and the second wireless device are IAB nodes operating in an IAB network.

Example 13: The method of example 1 to 12, wherein the first length of the first TTI associated with the first mode is longer than the second length of the second TTI associated with the second mode.

Example 14: A method for wireless communications at a first wireless device, comprising: receiving, from a second wireless device, an indication of a communication configuration for operating in a first mode, the communication configuration indicating one or more configuration parameters for at least one of a BWP, a length of an SSB, or a combination thereof, associated with the first mode; and communicating with the second wireless device in the first mode based at least in part on the one or more configuration parameters, wherein a first length of a first TTI associated with the first mode is different from a second length of a second TTI associated with a second mode.

Example 15: The method of example 14, wherein: the first mode is a first pathloss mode; and the second mode is a second pathloss mode.

Example 16: The method of example 15, wherein the first pathloss mode is a high pathloss mode and the second pathloss mode is a normal mode.

Example 17: The method of examples 14 to 16, further comprising: receiving the indication of the communication configuration to communicate based at least in part on the first wireless device operating in the first mode; and communicating after a time duration indicated by the communication configuration.

Example 18: The method of examples 14 to 17, further comprising: identifying an information element associated with at least one of the BWP, the SSB, or the combination thereof in the one or more configuration parameters, the information element indicating that the at least one of the BWP, the SSB, or the combination thereof is configured for the first mode.

Example 19: The method of example 18, wherein: the one or more configuration parameters comprises at least one of control resource set information, channel state information resources, sounding reference signal resources, a TTI duration, tracking reference signal information, or any combination thereof associated with the at least one of the BWP, the SSB, or the combination thereof; and the information element comprises a single bit field.

Example 20: The method of example 18, wherein: at least one of the one or more configuration parameters are the same as one or more configuration parameters for at least one of a second BWP, a second SSB, or a combination thereof associated with the second mode; and wherein a processing time parameter, a transmission beam parameter, a latency parameter, or any combination thereof of the one or more configuration parameters is the same as a corresponding parameter of one or more configuration parameters for the at least one of the second BWP, the second SSB, or the combination thereof.

Example 21: The method of examples 14 to 20, further comprising: receiving the indication of the communication configuration via RRC signaling or DCI or both.

Example 22: The method of examples 14 to 21, further comprising: configuring the BWP for the first wireless device for communications in the first mode, the BWP comprising one of a downlink BWP or an uplink BWP, wherein the configuration parameters are for the BWP; and configuring a second BWP for the first wireless device for communications in the second mode.

Example 23: The method of examples 14 to 22, wherein the first wireless device and the second wireless device are IAB nodes operating in an IAB network.

Example 24: The method of example 14 to 23, wherein the first length of the first TTI associated with the first mode is longer than the second length of the second TTI associated with the second mode.

Example 25: A method for wireless communications at a first wireless device, comprising: communicating with a second wireless device according to a current mode; determining a communication configuration for the second wireless device, the communication configuration comprising one or more configuration parameters for at least one of a BWP, a length of an SSB, or a combination thereof, associated with a first mode; and communicating with the second wireless device according to the first mode based at least in part on the one or more configuration parameters, wherein a first length of a first TTI associated with the first mode is different from a second length of a second TTI associated with a second mode.

Example 26: The method of example 25, wherein the determining further comprises: monitoring whether the second wireless device moves to the first mode.

Example 27. The method of examples 25 and 26, further comprising: entering the first mode for communications with the second wireless device; and communicating with the second wireless device via the at least one of the BWP, the SSB, or the combination thereof after a time duration after entering the first mode.

Example 28: The method of examples 25 to 27, wherein the one or more configuration parameters comprise at least one of control resource set information, channel state information resources, sounding reference signal resources, a TTI duration, tracking reference signal information, or any combination thereof associated with the BWP, the SSB, or the combination.

Example 29: The method of examples 25 to 28, wherein at least one of the one or more configuration parameters are the same as one or more configuration parameters for at least one of a second BWP, a second SSB, or a combination thereof associated with the second mode.

Example 30: The method of example 29, wherein a processing time parameter, a transmission beam parameter, a latency parameter, or any combination thereof of the one or more configuration parameters is the same as a corresponding parameter of the one or more configuration parameters for the second BWP, the second SSB, or the combination.

Example 31: The method of example 29, further comprising: configuring the BWP, SSB, or the combination for the second wireless device for communications in the first mode based at least in part on the one or more configuration parameters for the BWP, the SSB, or the combination; and configuring the second BWP, the SSB, or the combination for the second wireless device for communications in the second mode based at least in part on the one or more configuration parameters for the second BWP, the SSB, or the combination.

Example 32: The method of claims 25 to 31, wherein the first wireless device and the second wireless device are IAB nodes operating in an IAB network.

Example 33: The method of examples 25 to 32, wherein the first mode is a high pathloss mode and the second mode is a normal mode.

Example 34: The method of examples 25 to 33, wherein the first length of the first TTI associated with the first mode is longer than the second length of the second TTI associated with the second mode.

Example 35: An apparatus for wireless communications at a first wireless device, comprising: a processor; and memory coupled to the processor, the processor and memory configured to: determine a communication configuration for a second wireless device, the communication configuration indicating one or more configuration parameters for at least one of a BWP, a length of an SSB, or a combination thereof, associated with a first mode; transmit an indication of the communication configuration to the second wireless device for operating in the first mode, wherein a first length of a first TTI associated with the first mode is different from a second length of a second TTI associated with a second mode; and communicate with the second wireless device operating in the first mode based at least in part on the one or more configuration parameters.

Example 36: An apparatus for wireless communications comprising a processor; and memory coupled to the processor, the processor and memory configured to perform a method of any of examples 14 to 24.

Example 37: An apparatus for wireless communications comprising a processor; and memory coupled to the processor, the processor and memory configured to perform a method of any of examples 25 to 34.

Example 38: An apparatus comprising at least one means for performing a method of any of examples 1 to 13.

Example 39: An apparatus comprising at least one means for performing a method of any of examples 14 to 24.

Example 40: An apparatus comprising at least one means for performing a method of any of examples 25 to 34.

Example 41: A non-transitory computer-readable medium storing code for wireless communications, the code comprising instructions executable by a processor to perform a method of any of examples 1 to 13.

Example 42: A non-transitory computer-readable medium storing code for wireless communications, the code comprising instructions executable by a processor to perform a method of any of examples 14 to 24.

Example 43: A non-transitory computer-readable medium storing code for wireless communications, the code comprising instructions executable by a processor to perform a method of any of examples 25 to 34.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first wireless device, comprising:
   one or more processors; and
   one or more memories coupled with the one or more processors, the one or more processors configured to:
   transmit an indication of a communication configuration associated with a first pathloss mode, the first pathloss mode associated with a pathloss value that exceeds a threshold and associated with a higher pathloss relative to a second pathloss mode, wherein the communication configuration indicates one or more configuration parameters for a bandwidth part associated with the first pathloss mode; and
   communicate with a second wireless device according to the first pathloss mode based at least in part on the one or more configuration parameters.

2. The apparatus of claim 1, wherein the second pathloss mode is associated with a pathloss value that is below the threshold.

3. The apparatus of claim 1, wherein the one or more processors are further configured to:
   operate in the first pathloss mode for communications; and
   transmit the indication of the communication configuration to the second wireless device for the second wireless device to communicate based at least in part on operation of the first wireless device in the first pathloss mode.

4. The apparatus of claim 3, wherein the one or more processors are further configured to:
   communicate after a time duration indicated by the communication configuration.

5. The apparatus of claim 1, wherein the one or more processors are further configured to:
   transmit an information element for the bandwidth part in the one or more configuration parameters, wherein the information element indicates that the bandwidth part is configured for the first pathloss mode.

6. The apparatus of claim 5, wherein the one or more configuration parameters comprises at least one of control resource set information, channel state information resources, sounding reference signal resources, a transmission time interval duration, tracking reference signal information, or any combination thereof associated with the bandwidth part.

7. The apparatus of claim 5, wherein the information element comprises a bit field.

8. The apparatus of claim 5, wherein at least a portion of the one or more configuration parameters for the bandwidth part is a same as one or more second configuration parameters for a second bandwidth part associated with the second pathloss mode, and wherein a processing time parameter, a transmission beam parameter, a latency parameter, or any combination thereof of the one or more configuration parameters for the bandwidth part is the same as a corresponding parameter of the one or more second configuration parameters for the second bandwidth part.

9. The apparatus of claim 1, wherein the one or more processors are further configured to:
   transmit the indication of the communication configuration via radio resource control signaling, downlink control information, or both.

10. The apparatus of claim 1, wherein the apparatus further comprises an antenna, and wherein the first wireless device and the second wireless device are Integrated Access and Backhaul (IAB) nodes in an IAB network.

11. The apparatus of claim 1, wherein a first length of a first transmission time interval associated with the first pathloss mode is longer than a second length of a second transmission time interval associated with the second pathloss mode.

12. An apparatus for wireless communications at a first wireless device, comprising:
    one or more processors; and
    one or more memories coupled with the one or more processors, the one or more processors configured to:
    receive an indication of a communication configuration associated with a first pathloss mode, the first pathloss mode associated with a pathloss value that exceeds a threshold and associated with a higher pathloss relative to a second pathloss mode, wherein the communication configuration indicates one or more configuration parameters for a bandwidth part associated with the first pathloss mode; and
communicate with a second wireless device according to the first pathloss mode based at least in part on the one or more configuration parameters.

13. The apparatus of claim 12, wherein the second pathloss mode is associated with a pathloss value that is below the threshold.

14. The apparatus of claim 12, wherein the one or more processors are further configured to:
receive the indication of the communication configuration to communicate; and
communicate after a time duration indicated by the communication configuration.

15. The apparatus of claim 12, wherein the one or more processors are further configured to:
identify an information element associated with the bandwidth part in the one or more configuration parameters, wherein the information element indicates that the bandwidth part is configured for the first pathloss mode.

16. The apparatus of claim 15, wherein the one or more configuration parameters comprise at least one of control resource set information, channel state information resources, sounding reference signal resources, a transmission time interval duration, tracking reference signal information, or any combination thereof associated with the bandwidth part, and wherein the information element comprises a single bit field.

17. The apparatus of claim 15, wherein at least one of the one or more configuration parameters for the bandwidth part is a same as one or more second configuration parameters for a second bandwidth part associated with the second pathloss mode; and wherein a processing time parameter, a transmission beam parameter, a latency parameter, or any combination thereof of the one or more configuration parameters for the bandwidth part is the same as a corresponding parameter of the one or more second configuration parameters for the second bandwidth part.

18. The apparatus of claim 12, wherein the one or more processors are further configured to:
receive the indication of the communication configuration via radio resource control (RRC) signaling, downlink control information (DCI), or both.

19. The apparatus of claim 12, wherein the apparatus further comprises an antenna, and wherein the first wireless device and the second wireless device are Integrated Access and Backhaul (IAB) nodes in an IAB network.

20. The apparatus of claim 12, wherein a first length of a first transmission time interval associated with the first pathloss mode is longer than a second length of a second transmission time interval associated with the second pathloss mode.

21. An apparatus for wireless communications at a first wireless device, comprising:
one or more processors; and
one or more memories coupled with the one or more processors, the one or more processors configured to:
transmit an indication of a communication configuration associated with a first pathloss mode, wherein a first length of a first transmission time interval associated with the first pathloss mode is different from a second length of a second transmission time interval associated with a second pathloss mode, wherein the first pathloss mode is associated with a higher pathloss relative to the second pathloss mode; and
communicate with a second wireless device according to the first pathloss mode based at least in part on the communication configuration.

22. The apparatus of claim 21, wherein the communication configuration indicates one or more configuration parameters for a synchronization signal block associated with the first pathloss mode.

23. The apparatus of claim 22, wherein the one or more processors are further configured to:
transmit an information element for the synchronization signal block in the one or more configuration parameters, wherein the information element indicates that the synchronization signal block is configured for the first pathloss mode.

24. The apparatus of claim 21, wherein the apparatus further comprises an antenna, and wherein the first pathloss mode is a high pathloss mode associated with a pathloss value that exceeds a threshold and the second pathloss mode is a normal mode associated with a pathloss value that is below the threshold.

25. The apparatus of claim 21, wherein the one or more processors are further configured to:
operate in the first pathloss mode for communications; and
transmit the indication of the communication configuration to the second wireless device for the second wireless device to communicate based at least in part on operation of the first wireless device in the first pathloss mode.

26. The apparatus of claim 25, wherein the one or more processors are further configured to:
communicate with the second wireless device after a time duration indicated by the communication configuration.

27. An apparatus for wireless communications at a first wireless device, comprising:
one or more processors; and
one or more memories coupled with the one or more processors, the one or more processors configured to:
receive an indication of a communication configuration associated with a first pathloss mode; and
communicate with a second wireless device according to the first pathloss mode based at least in part on the communication configuration, wherein a first length of a first transmission time interval associated with the first pathloss mode is different from a second length of a second transmission time interval associated with a second pathloss mode, wherein the first pathloss mode is associated with a higher pathloss relative to the second pathloss mode.

28. The apparatus of claim 27, wherein the communication configuration indicates one or more configuration parameters for a synchronization signal block associated with the first pathloss mode.

29. The apparatus of claim 27, wherein the apparatus further comprises an antenna, and wherein the first pathloss mode is a high pathloss mode associated with a pathloss value that exceeds a threshold and the second pathloss mode is a normal mode associated with a pathloss value that is below the threshold.

30. The apparatus of claim 27, wherein the one or more processors are further configured to:
receive the indication of the communication configuration to communicate; and communicate after time duration indicated by the communication configuration.

31. An apparatus for wireless communications at a first wireless device, comprising:
one or more processors; and
one or more memories coupled with the one or more processors, the one or more processors configured to:
receive an indication of a communication configuration for operation in a first pathloss mode, the first pathloss mode associated with a pathloss value that exceeds a threshold, wherein the communication configuration indicates one or more configuration parameters for a synchronization signal block associated with the first pathloss mode; and
communicate with a second wireless device in the first pathloss mode based at least in part on the one or more configuration parameters, wherein a first length of a first transmission time interval associated with the first pathloss mode is different from a second length of a second transmission time interval associated with a second pathloss mode, the second pathloss mode associated with the pathloss value that is below the threshold.

32. An apparatus for wireless communications at a first wireless device, comprising:
one or more processors; and
one or more memories coupled with the one or more processors, the one or more processors configured to:
communicate with a second wireless device according to a current pathloss mode; and
communicate with the second wireless device according to a first pathloss mode based at least in part on a communication configuration for the second wireless device, the communication configuration comprising one or more configuration parameters for a synchronization signal block associated with the first pathloss mode, the first pathloss mode associated with a pathloss value that exceeds a threshold, wherein a first length of a first transmission time interval associated with the first pathloss mode is different from a second length of a second transmission time interval associated with a second pathloss mode, wherein the second pathloss mode is associated with a pathloss value that is below the threshold.

33. A method for wireless communications at a first wireless device, comprising:
transmitting an indication of a communication configuration associated with a first pathloss mode, the first pathloss mode associated with a pathloss value exceeding a threshold and associated with a higher pathloss relative to a second pathloss mode, the communication configuration indicating one or more configuration parameters for a bandwidth part associated with the first pathloss mode; and
communicating with a second wireless device according to the first pathloss mode based at least in part on the one or more configuration parameters.

34. The method of claim 33, wherein the second pathloss mode is associated with a pathloss value being below the threshold.

35. A method for wireless communications at a first wireless device, comprising:
receiving an indication of a communication configuration associated with a first pathloss mode, the first pathloss mode associated with a pathloss value exceeding a threshold and associated with a higher pathloss relative to a second pathloss mode, wherein the communication configuration indicates one or more configuration parameters for a bandwidth part associated with the first pathloss mode; and
communicating with a second wireless device according to the first pathloss mode based at least in part on the one or more configuration parameters.

36. The method of claim 35, wherein the second pathloss mode is associated with a pathloss value being below the threshold.

37. A method for wireless communications at a first wireless device, comprising:
transmitting an indication of a communication configuration associated with a first pathloss mode, wherein a first length of a first transmission time interval associated with the first pathloss mode is different from a second length of a second transmission time interval associated with a second pathloss mode, wherein the first pathloss mode is associated with a higher pathloss relative to the second pathloss mode; and
communicating with a second wireless device according to the first pathloss mode based at least in part on the communication configuration.

38. The method of claim 37, wherein the communication configuration indicates one or more configuration parameters for a synchronization signal block associated with the first pathloss mode.

39. A method for wireless communications at a first wireless device, comprising:
receiving an indication of a communication configuration associated with a first pathloss mode; and
communicating with a second wireless device according to the first pathloss mode based at least in part on the communication configuration, wherein a first length of a first transmission time interval associated with the first pathloss mode is different from a second length of a second transmission time interval associated with a second pathloss mode, wherein the first pathloss mode is associated with a higher pathloss relative to the second pathloss mode.

40. The method of claim 39, wherein the communication configuration indicates one or more configuration parameters for a synchronization signal block associated with the first pathloss mode.

41. A non-transitory computer-readable medium storing code for wireless communications at a first wireless device, the code comprising instructions executable by one or more processors to cause the first wireless device to:
transmit an indication of a communication configuration associated with a first pathloss mode, the first pathloss mode associated with a pathloss value exceeding a threshold and associated with a higher pathloss relative to a second pathloss mode, the communication configuration indicating one or more configuration parameters for a bandwidth part associated with the first pathloss mode; and
communicate with a second wireless device according to the first pathloss mode based at least in part on the one or more configuration parameters.

42. The non-transitory computer-readable medium of claim 41, wherein the second pathloss mode is associated with a pathloss value being below the threshold.

43. A non-transitory computer-readable medium storing code for wireless communications at a first wireless device, the code comprising instructions executable by one or more processors to cause the first wireless device to:
receive an indication of a communication configuration associated with a first pathloss mode, the first pathloss mode associated with a pathloss value exceeding a threshold and associated with a higher pathloss relative to a second pathloss mode, wherein the communication configuration indicates one or more configuration parameters for a bandwidth part associated with the first pathloss mode; and communicate with a second wireless device according to the first pathloss mode based at least in part on the one or more configuration parameters.

44. The non-transitory computer-readable medium of claim 43, wherein the second pathloss mode is associated with a pathloss value being below the threshold.

45. A non-transitory computer-readable medium storing code for wireless communications at a first wireless device, the code comprising instructions executable by one or more processors to cause the first wireless device to:

transmit an indication of a communication configuration associated with a first pathloss mode, wherein a first length of a first transmission time interval associated with the first pathloss mode is different from a second length of a second transmission time interval associated with a second pathloss mode, wherein the first pathloss mode is associated with a higher pathloss relative to the second pathloss mode; and communicate with a second wireless device according to the first pathloss mode based at least in part on the communication configuration.

46. The non-transitory computer-readable medium of claim 45, wherein the communication configuration indicates one or more configuration parameters for a synchronization signal block associated with the first pathloss mode.

47. A non-transitory computer-readable medium storing code for wireless communications at a first wireless device, the code comprising instructions executable by one or more processors to cause the first wireless device to:

receive an indication of a communication configuration associated with a first pathloss mode; and communicate with a second wireless device according to the first pathloss mode based at least in part on the communication configuration, wherein a first length of a first transmission time interval associated with the first pathloss mode is different from a second length of a second transmission time interval associated with a second pathloss mode, wherein the first pathloss mode is associated with a higher pathloss relative to the second pathloss mode.

48. The non-transitory computer-readable medium of claim 47, wherein the communication configuration indicates one or more configuration parameters for a synchronization signal block associated with the first pathloss mode.

* * * * *